Figure 1:
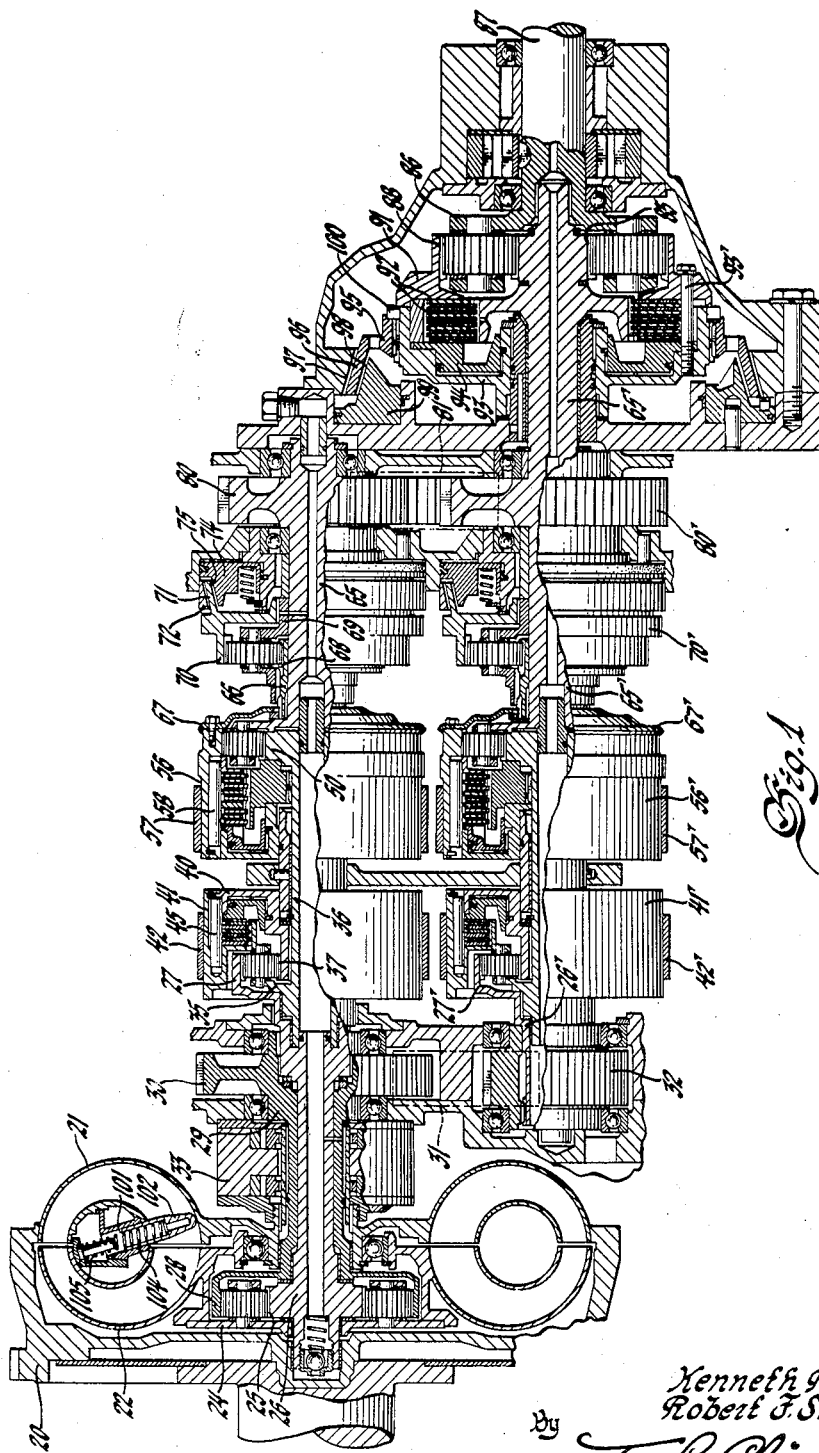

Dec. 20, 1960     K. P. KIRCHOFF ET AL     2,964,962
POWER SHIFTING MULTI-STEP TRANSMISSIONS
Filed Dec. 23, 1953                        9 Sheets-Sheet 1

Inventors
Kenneth P. Kirchoff &
Robert F. Shepherd
By
T. L. Chisholm
Attorney

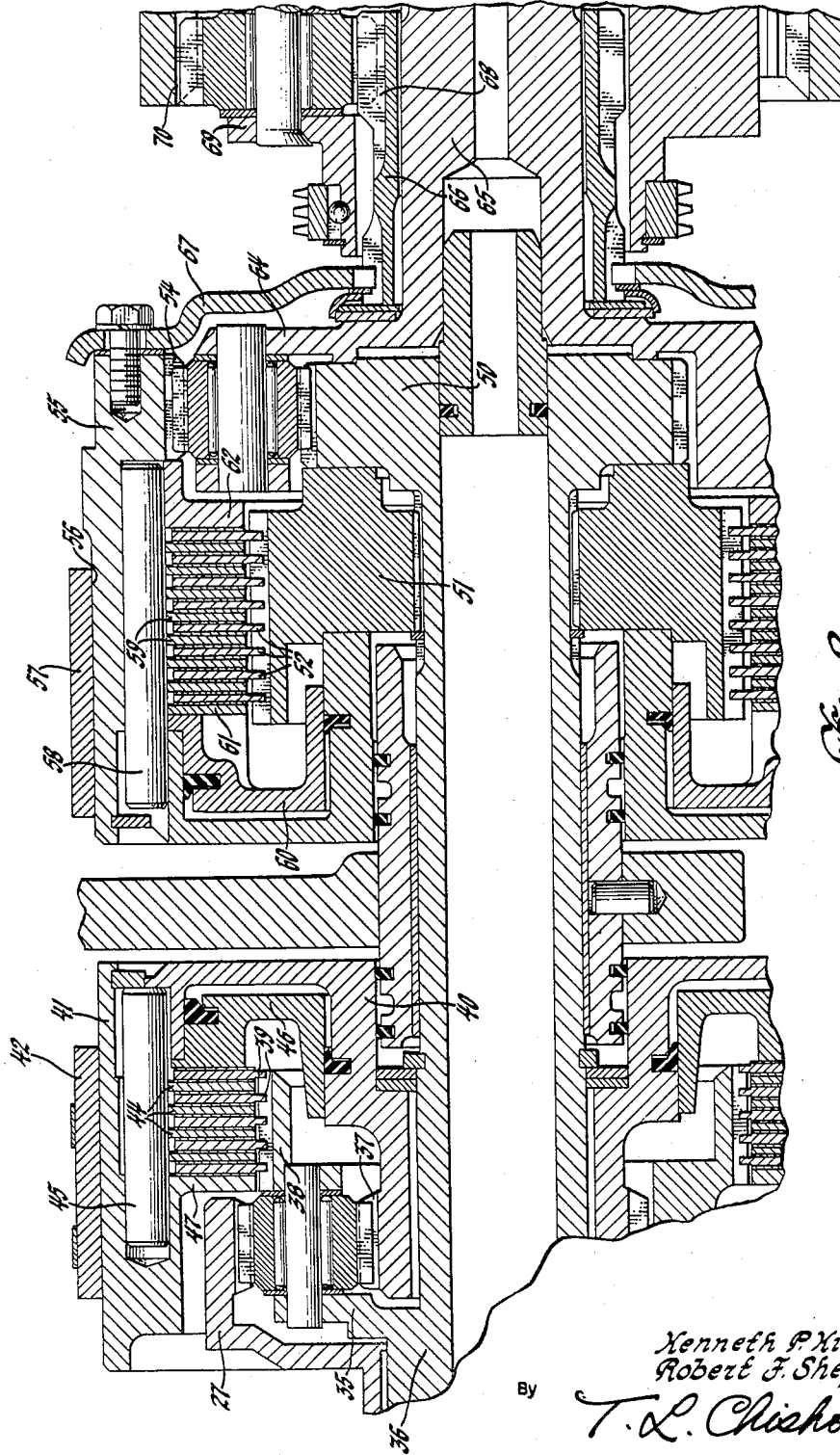

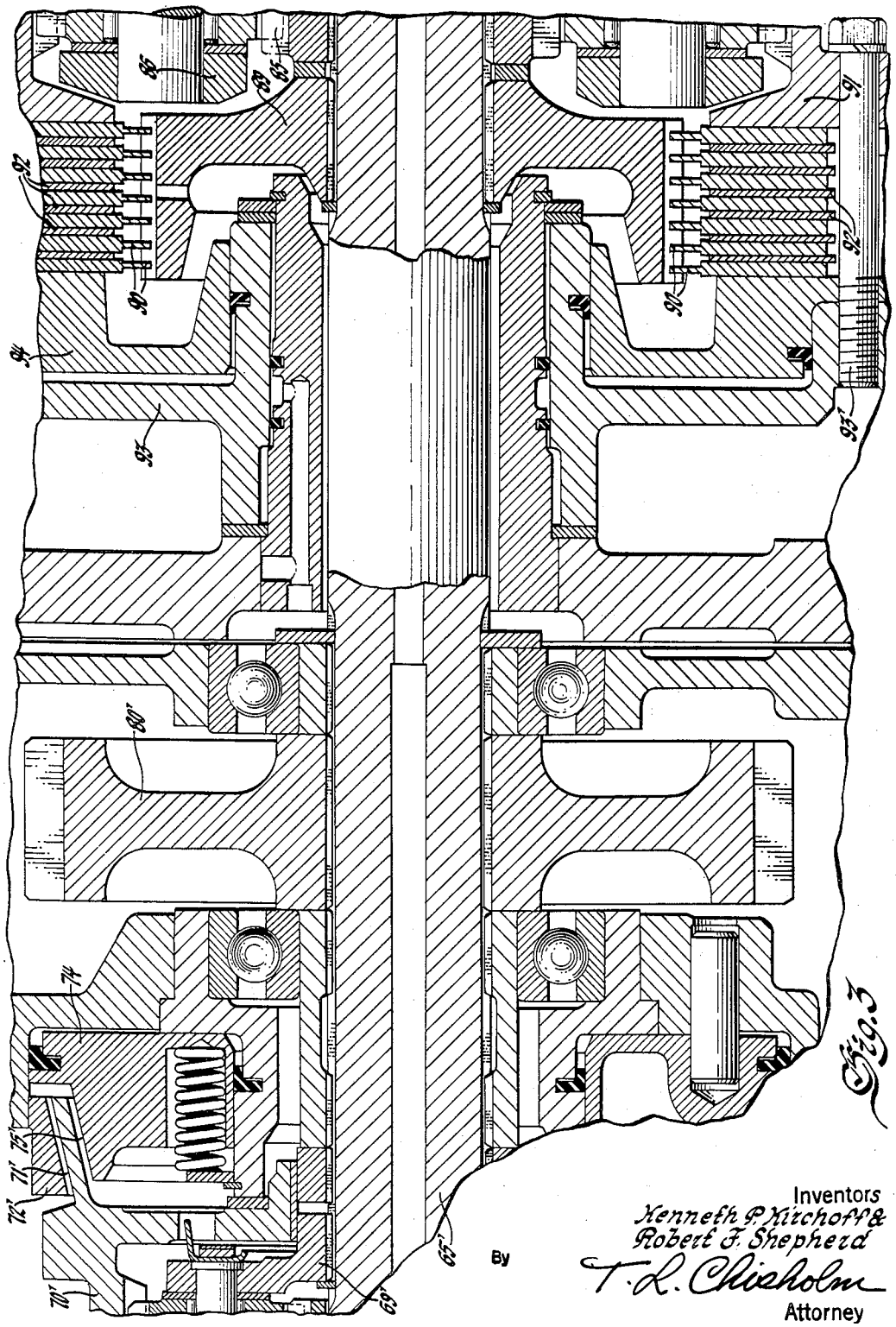

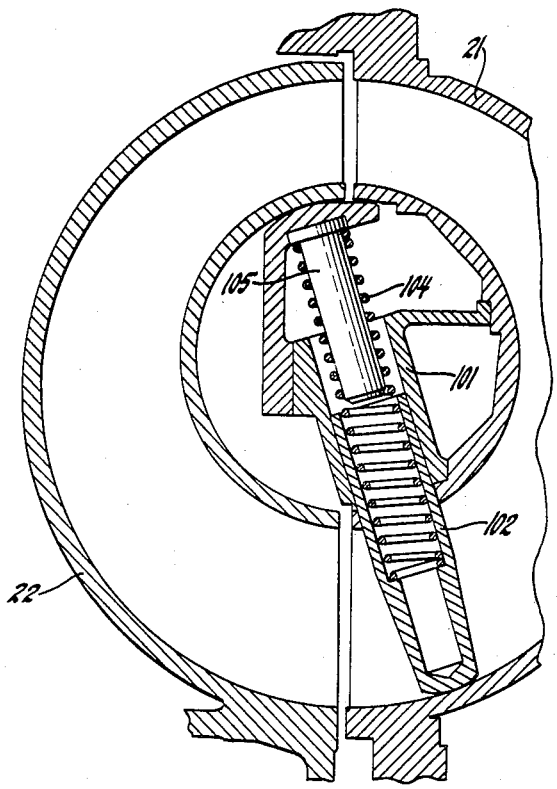
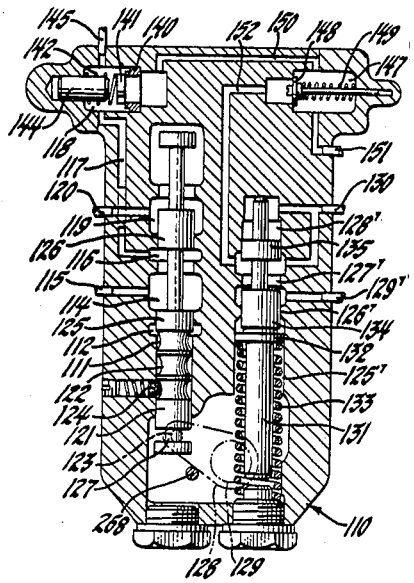
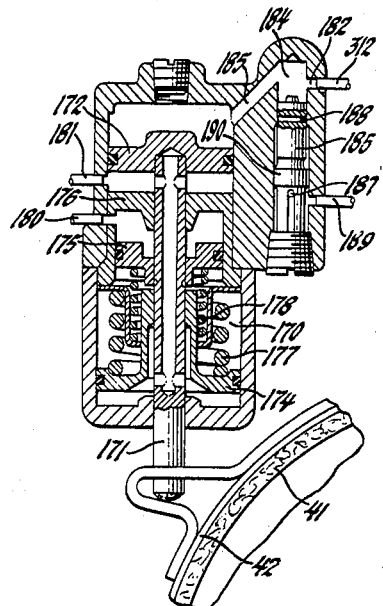
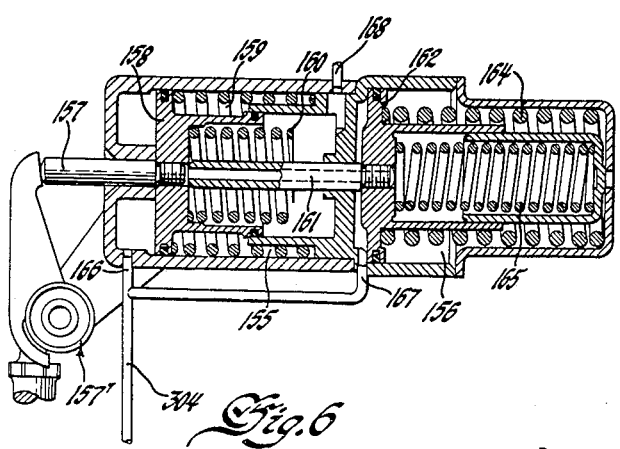

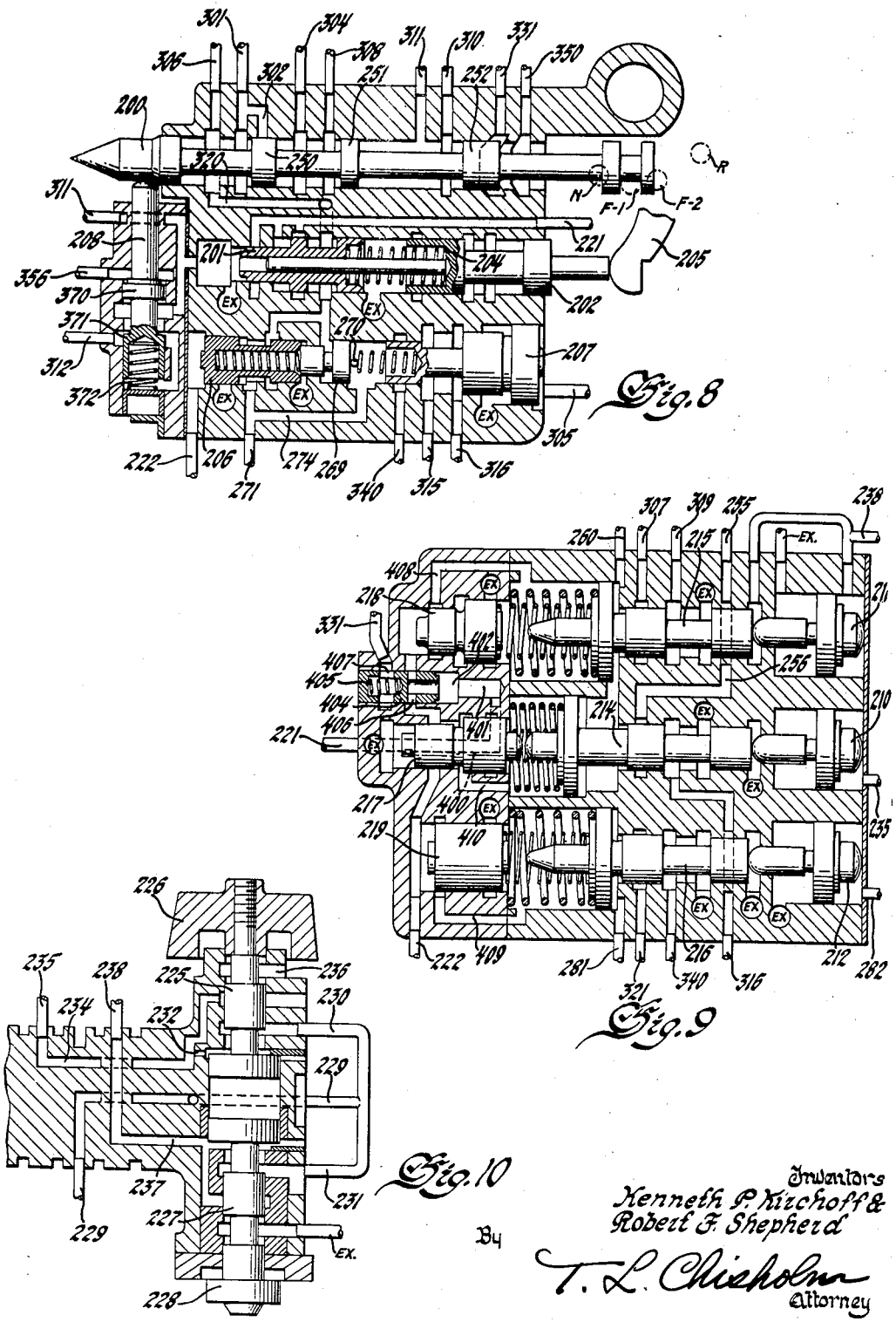

United States Patent Office 2,964,962
Patented Dec. 20, 1960

2,964,962

POWER SHIFTING MULTI-STEP TRANSMISSIONS

Kenneth P. Kirchoff, Livonia, and Robert F. Shepherd, Pontiac, Mich., assignors to General Motors Corporation, Detroit, Mich., a corporation of Delaware Filed Dec. 23, 1953, Ser. No. 400,078

9 Claims. (Cl. 74—472)

This invention relates to improvements in transmissions and, more particularly, to improvements in power shifting multi-step transmissions, and is an improvement over the mechanism illustrated and described in the copending application of Oliver K. Kelley, S.N. 327,568, filed December 23, 1952, for Power Shifting Multi-step Transmissions.

In internal combustion engine driven vehicles, it is customary to provide transmissions interposed between the engine and the driving axle of such character that changes in gear ratio can be made over a relatively wide range. In cases where the desired range is very wide and maximum performance is of great value, it becomes necessary to provide mechanisms for obtaining a progressive change in gear ratio in a great number of steps, with only a small difference between each successive step. Transmissions for this purpose involving many gear ratios necessarily become quite cumbersome and, if the gearing is arranged in tandem fashion, the overall construction of the gearing and the complication of controls for the multitudinous shifts present a major technical and economic problem.

This invention is particularly useful in association with an engine having a governor thereon for limiting the speed of the output or crank shaft thereof. In certain types of engines it is advantageous to operate the same at their top governed speed, which usually is the speed of highest engine efficiency. The controls of the present transmission therefore are so arranged and calibrated that a shift from a lower speed ratio to the next higher speed ratio occurs only when the crank shaft of the engine, and consequently the output shaft of the transmission, have attained a speed of rotation which is the maximum possible for fuel feed engine operation in the lower ratio.

As the result of this arrangement hydraulic pressure, which is metered in accordance with the position of the engine throttle or other fuel control devices, always reaches a predetermined maximum pressure, requiring relatively high hydraulic pressure delivered by a transmission output shaft governor before an upshift can occur in the transmission. In this type of operation it may be desirable to provide controls whereby the operator is able to lock the transmission in any particular gear ratio at which the transmission may be operating at any particular time. Such locking of the transmission in any particular ratio may be advantageous in certain types of road travel wherein, under full automatic operation, the transmission might be undergoing frequent shifting from one speed ratio to the next higher speed ratio and immediately back to the lower ratio.

Since the invention makes possible the locking of the transmission in any particular ratio to prevent a shift to the next higher ratio under normal operating conditions, it becomes advisable to permit such shift to occur when the vehicle in which the engine and transmission are mounted attains a speed which causes the transmission output shaft and consequently the engine crank shaft to rotate at higher speeds than that afforded by the fuel driven engine to prevent damage to the engine. This condition may occure when the vehicle is descending a grade.

An object of the invention is to provide in association with a governed engine a transmission having the controls thereof so arranged as to permit the transmission to automatically progress from lowest speed ratio to highest speed ratio, with the shifts occurring at maximum engine speed determined by engine governor action.

Another object of the invention is to provide controls for a transmission as just described in which the operator may manually and hydraulically lock the transmission in any particular speed ratio against a shift to the next higher speed ratio under normal engine operating condition.

A further object of the invention is to provide a transmission as previously described in which the controls are so arranged as to permit a shift from the speed ratio in which the transmission is manually held to the next higher speed ratio when the output shaft speed exceeds that which would result from maximum governed engine speed.

In carrying out the foregoing and other objects of the invention, a transmission incorporating the same may be composed of two or more parallel plural step ratio change mechanisms of any of a number of well-known types. For example, in the described embodiment of the invention, use is made, in each of the mechanisms, of a well-known commercial automatic transmission of four forward speeds and a reverse. Each of these mechanisms has its own hydraulic controls for causing automatic change of speed ratio in response to torque demand, as represented by throttle action, and vehicle speed, as represented by fluid pressure from its governor driven by its output shaft. In this particular arrangement use is made of a single fluid coupling serving the two mechanisms, the pump of which is driven directly by the fly-wheel of the engine, and the turbine or runner of which is connected through a planetary gear arrangement to the respective inputs of the two transmissions in such fashion that these inputs are differentially driven. The output shafts of the two transmissions are geared together so that the output shaft of one of them runs faster than the other.

The transmissions may be so arranged and controlled that, under normal driving conditions, shifting occurs automatically, but that under certain conditions shifting can be prevented within certain ranges of hydraulic pressure developed by the transmission output shaft governor.

It the two transmissions have equal automatic shifting mechanisms, it is obvious that the faster running transmission will upshift automatically at a lower vehicle speed than the slower running transmission. The differential drive to the inputs of the two transmissions accommodates this action, affecting the engine speed only by one half of the ratio change of the shifting unit and affecting the overall drive ratio of the combination by only one half of the same ratio change.

It is evident that if three of these units were used in a similar differential arrangement, the effect of one unit's shifting would be only one third in overall ratio. Extremely small ratio changes can thus be obtained by the use of several transmissions in this arrangement.

Parts of the hydraulic controls for these individual mechanisms are operated in unison, preferably in response to throttle action, while other parts thereof operate in response to throttle action associated with output shaft speed as represented by the fluid pressure of the individual governors driven by these output shafts. The result of this interconnection and association is that the respective mechanisms operate to change gear ratio independently, one after the other, so that, due to the difference in output speed, determined by the ratio of connection between the output shafts, the change in gear ratio in the mechanisms will take place at staggered intervals, one relative to the other. Thus, with two mechanisms, each having gearing providing four forward speeds, it is possible to obtain, due to their coaction, seven forward speeds with overall drive ratio steps only half as large as the steps in each unit. A similar result would be obtained if the two units had their outputs geared at equal speeds, but their governors geared differently. Another way would provide equal speeds of the two units including the governors but with different weights of the governors to make them act as if they were running at different speeds. Still a further way could make use of a single governor and impose design changes in the controls of one unit so as to make it shift at lower vehicle speeds than the other unit.

Furthermore, additional speed ranges can be obtained by appending to the output shaft of this parallel drive an additional planetary unit which can provide either a reduction ratio or a direct drive condition. With this additional unit, it will be evident that the operator of the vehicle may have a choice of fourteen possible speed ratios.

The controls of the transmission are of such nature as to supply hydraulic pressures resulting from throttle action and from output shaft speed. The various shift valves and the springs used in connection therewith are so calibrated that a shift from a lower speed ratio to a higher speed ratio occurs only under maximum throttle valve pressure indicative of maximum engine governed speed, with the result that the upshift just described can be prevented or deferred by supplying to the shift valve train hydraulic pressure greater than that which can be supplied by the throttle valve. This high pressure can be under the control of a suitable manual valve which also controls the functioning of the apparatus for automatic operation under normal driving conditions.

The differential drive to the two units divides the engine torque into two. Thus each transmission works under loads and stresses like those imposed by an engine of only half the size. Commonly available smaller size automatic transmissions can thus be combined to serve much larger power plants without danger of overloading the mechanism. It is within the contemplation of the invention that the parallel mechanisms need not necessarily be limited to two but can be increased as may be desired, and the speed changes of each mechanism can be any desired number.

Figure 11:
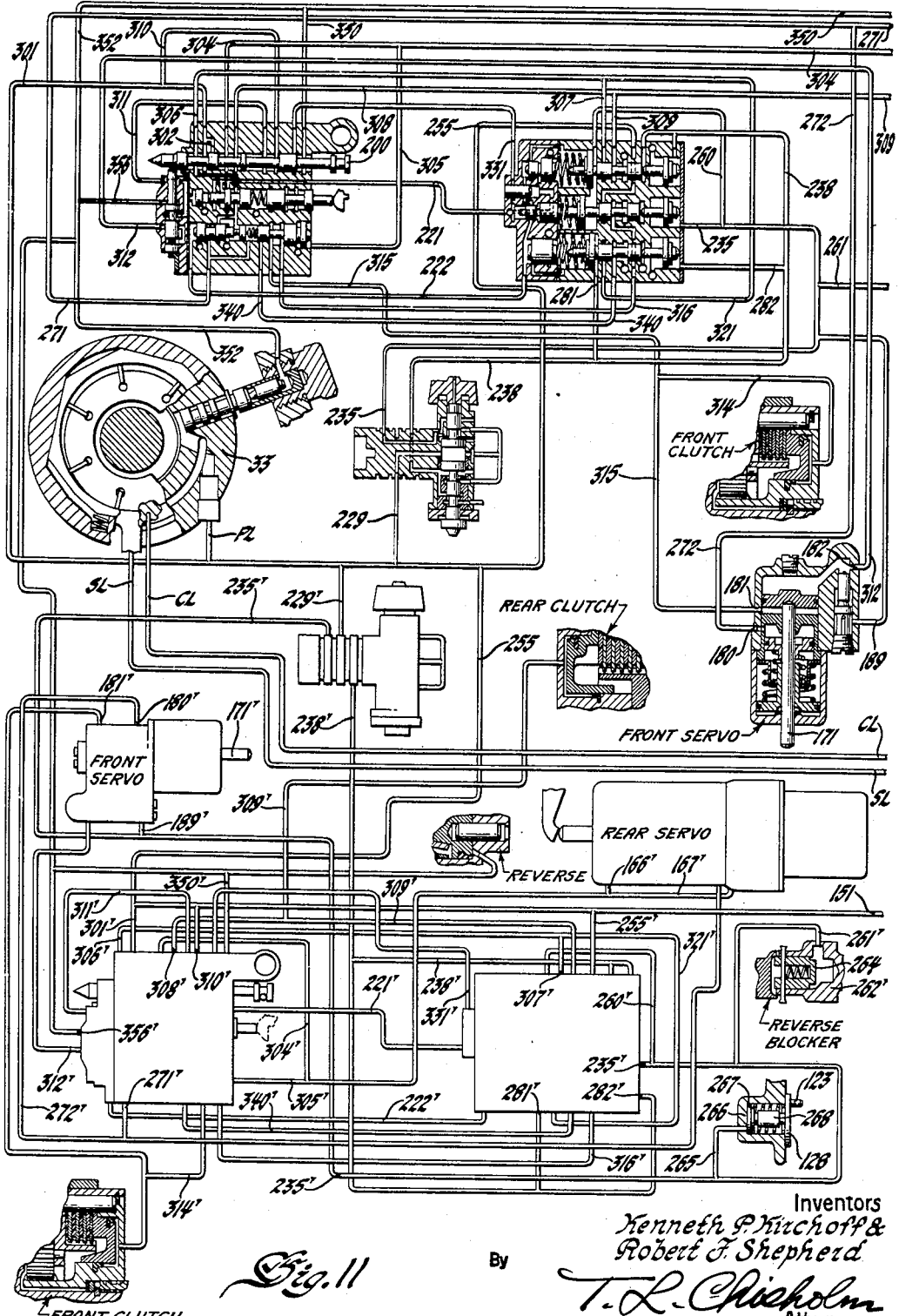
Figure 12:
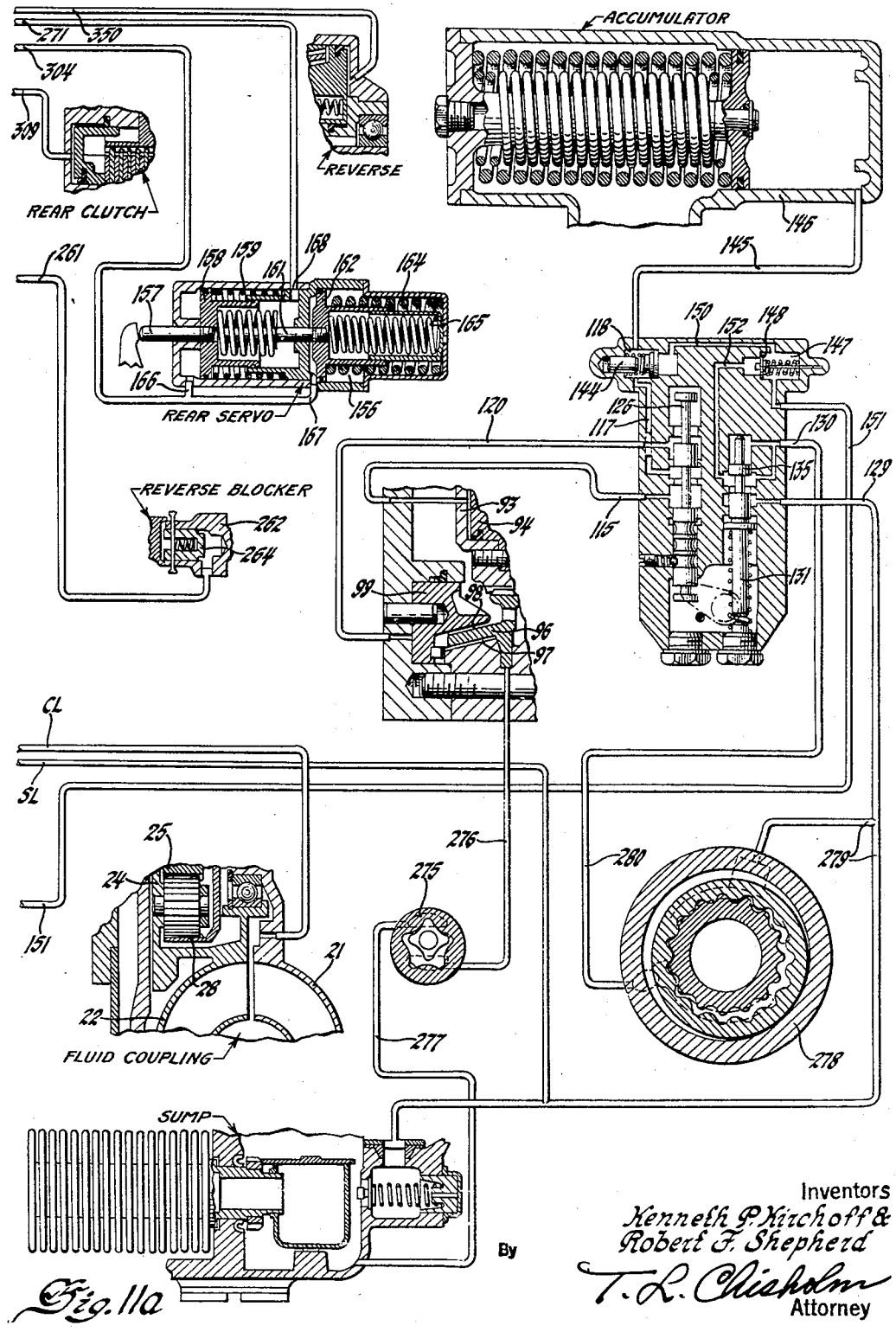
Figure 13:
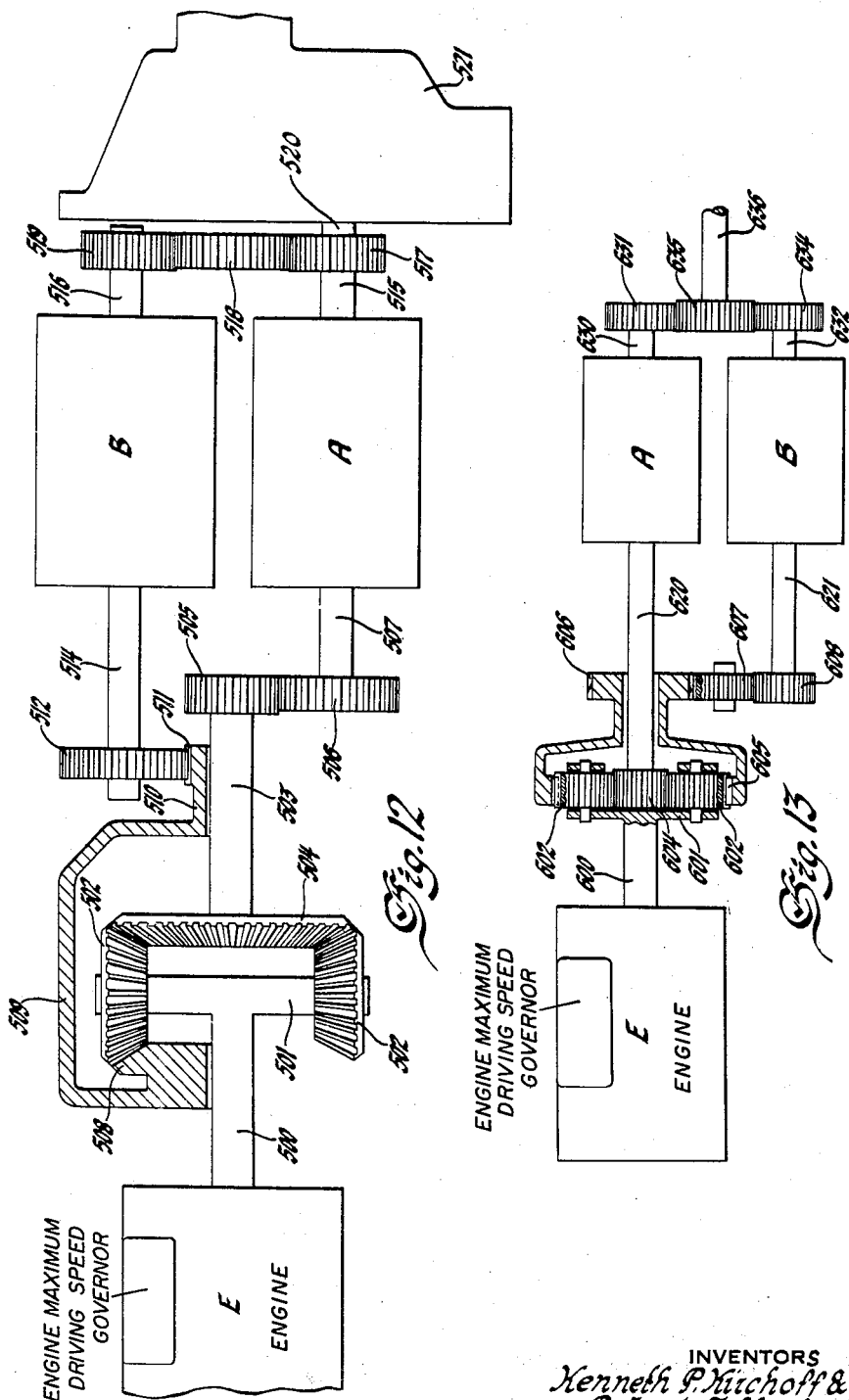
Figure 14:
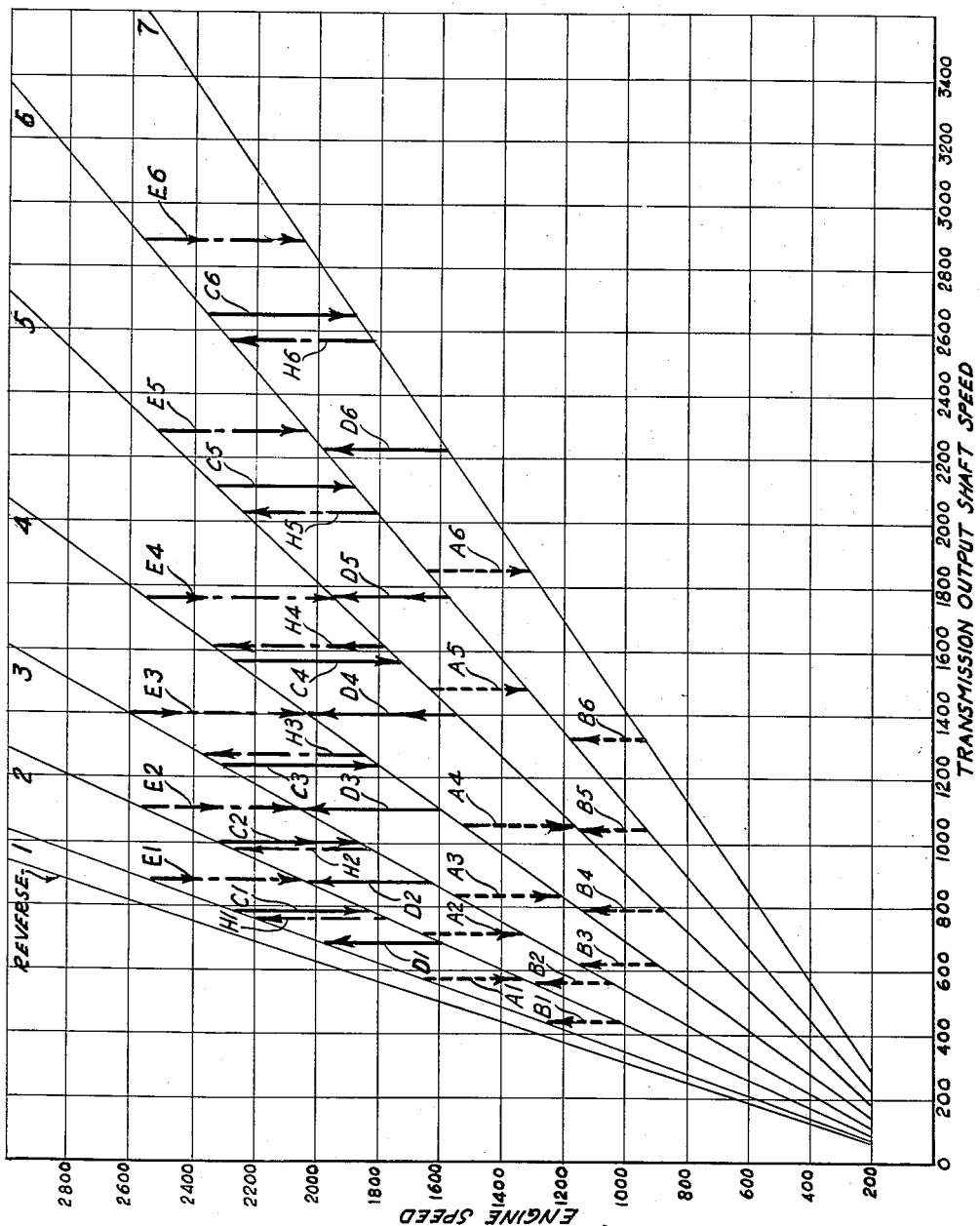

Other features, objects, and advantages of the invention will be apparent by referring to the following detailed description of the accompanying drawings, in which Fig. 1 is a side elevation partially in vertical secton of a transmission embodying the invention, Fig. 2 is an enlarged vertical section showing parts of the two planetary units used in each parallel mechanism for obtaining forward drive, Fig. 3 is an enlarged vertical section showing a part of the reverse mechanism of one of the units and a part of the final gearing unit employed in the transmission, Fig. 4 is an enlarged section showing a feature of construction of the fluid coupling, Fig. 5 is a section of the manually operated valve for controlling the final unit of the transmission, Fig. 6 is a section through the servo unit associated with the rear planetary of each mechanism, Fig. 7 is a similar view of the servo unit associated with the front planetary of each mechanism, Fig. 8 is a section through a part of the control valves of one of the mechanisms, Fig. 9 is a similar section through another part of the valve body showing the various elements mounted therein, Fig. 10 is a section through one of the governors, Figs. 11 and 11a together constitute a schematic diagram showing a part of the hydraulic mechanism and its association with the various operating parts, Figs. 12 and 13 are diagrammatic representations of embodiments of the invention, and Fig. 14 is a graphic chart illustrating the manner in which the transmission responds under various control conditions.

Referring to the drawings, the gearing and other mechanical parts of the transmission have been illustrated in Figs. 1, 2 and 3. Referring particularly to Fig. 1, 20 indicates the flywheel construction driven by the engine (not shown) of the vehicle. This flywheel construction is connected to the pump or driving element 21 of a fluid coupling of well-known type. The turbine or runner 22 of the coupling is connected to a planetary carrier 24 to cause rotation of the carrier and its planet gears therewith. The sun gear 25, associated with the planets mounted on the carrier 24, is secured to or forms part of a sleeve shaft 26 which is extended in steps to the ring gear 27 of the front driving unit of the upper plural step ratio change mechanism incorporated in this invention. The ring gear 28, associated with the planets of carrier 24, is attached to a sleeve shaft 29, which extends in steps to a gear 30 connected through an idler indicated by dotted lines 31 to another gear 32, the shaft of which is extended in steps to the ring gear 27' of the lower plural step ratio change mechanism employed in this invention. Pump 33 is conected to be driven by the pump 21 of the fluid coupling. This pump may be of any well-known type but preferably is of the variable capacity type, particularly as described in the forfeited application of Herndon et al., S.N. 153,342, filed April 1, 1950, for Variable Capacity Pump. The pump operates to deliver oil to meet variable demands at a pressure regulated within the pump.

Inasmuch as the upper and lower mechanisms, driven respectively by the ring gears 27 and 27', are of substantially identical construction, it is believed that a more detailed description of the parts of one thereof will suffice. The compound planetary gearing employed in each of these mechanisms is of generally well-known character, consisting of a front driving planetary unit, a rear driving planetary unit, and a reverse planetary unit.

The front driving planetary unit, of which ring gear 27 is a part, also comprises the planet carrier 35, secured to or formed as part of intermediate shaft 36, and sun gear 37 mounted for rotation about the shaft 36. Planet carrier 35, in addition to having planets mounted thereon, is extended into an annulus 38 upon which are slidably mounted a plurality of clutch plates 39. The sun gear 37 is, in effect, extended into a drum 40, the periphery 41 of which serves as a brake surface to be engaged by a brake band 42. A plurality of clutch plates 44 are mounted within the drum for sliding movement relative thereto and are compelled to rotate therewith by the engagement of one or more rods 45 with notches in the peripheries of the clutch plates. A clutch piston 46 is also mounted within the drum 40 for movement under hydraulic pressure to force the cooperating plates 39 and 44 together and against the resistance offered by a backing plate 47 for locking the sun gear to the planet carrier.

The intermediate shaft 36 is extended to a sun gear 50 of the rear drive unit, this gear being either secured to or formed as part of the shaft 36. Splined to shaft 36 is a member 51, the periphery of which serves to retain, for sliding motion, a plurality of clutch plates 52. Inasmuch as the member 51 is splined to the shaft 36, it must of necessity rotate in unison with the sun gear 50. The ring gear 54 is mounted within a drum 55, the periphery of which, as indicated at 56, can be engaged by a brake band 57 which, when applied, serves to prevent rotation of the ring gear. Drum 55 is so shaped as to retain one or more rods 58 which serve to locate and to compel rotation of a plurality of slidable clutch plates 59. A piston 60 is mounted in the drum 55 for applying pressure to force the plates 52 and 59 together between plate 61 and buttress 62 thereby to lock sun gear 50 and ring gear 54 together. Planet carrier 64, the planets of which mesh with the sun gear 50 and ring gear 54, is secured to or formed as part of output shaft 65. The ring gear 54 is effectively connected to a sleeve shaft 66 by a washer-like member 67, attached near its extremity to the drum 55 and having its central aperture splined to the shaft 66.

The reverse planetary unit has its sun gear 68 secured to or formed as part of the sleeve shaft 66 and meshes with the planets of carrier 69, which is secured to the output shaft 65 for rotation therewith. The ring gear 70 of this unit has a hub rotatable about the extension of the carrier and also has a cone 71 extending angularly outwardly therefrom. Another cone 72 is attached to the housing for this transmission and a piston 74 has a coned surface 75 thereon which can engage the cone 71 and force it into engagement with cone 72, thereby grounding the ring gear or locking it against rotation.

The output shaft 65 terminates in a gear 80 which may be integral therewith or may be secured thereto in any fashion for concurrent rotation. Gear 80 is connected by an idler 81, shown in dotted lines in Fig. 1, with a gear 80' which is driven by the output shaft 65' of the lower mechanism. The relative size of the gears 80 and 80' is predetermined so that rotation of the shaft 65 will be at a definite ratio to the rotation of shaft 65' with the ratio between the shafts being such as to fit the conditions for which the transmission is to be used. For example, in the described embodiment of the invention, a ratio of 1.25 to 1.00 is selected since that is about half the average ratio step of the two parallel four speed transmissions used; this will then provide seven reasonably equal speed ratios due to the independent type of governor control selected, as previously described.

It will be understood that the elements combined to form the lower unit are substantially identical in character with those described in connection with the upper unit, and hence the same reference characters with the addition of a prime have been used to identify these corresponding parts.

By reference to Fig. 1 and also to Fig. 3, it will be seen that the output shaft 65' of the lower mechanism has been extended to serve as a common output shaft for both mechanisms. This extension is of such length as to permit the addition of a reduction unit to the mechanisms. This unit comprises a sun gear 85 secured to or formed as a part of the extension of shaft 65', a planet carrier 86 connected to a propeller shaft 87, and a ring gear 88. Secured to shaft 65', for rotation with the sun gear 85, is a plate annulus 89, to the periphery of which are slidably secured a plurality of clutch plates 90. The ring gear 88 has an extension 91 secured to a drum-like member 93 by bolts 93', within which are slidably mounted, for rotation therewith, a plurality of plates 92. A piston 94 is secured within the drum to compress the plates 90 and 92 to effectively lock the ring gear to the sun gear. The drum 93 has splined to the periphery thereof a ring 95 from which extends a cone 96. Co-operating with cone 96 are the cone surface 97, attached to the housing, and the cone surface 98 of a piston 99 which can be moved under hydraulic pressure to cause engagement of the cone 96 between the surfaces 97 and 98, thereby to lock the ring gear to the housing or, in effect, to ground the same. The splined connection between the ring 95 and the drum 91 permits such movement of the ring and the cone as will be necessary for this engagement, while a wavy spring 100 serves to move the cone 96 away from surface 97 when such locking is not desired.

Oil seals have been shown at various points through the entire mechanism to prevent leakage at these points which might interfere with proper operation of the mechanism. Inasmuch as the use of seals for this purpose, and also the use of various lubrication channels, are all well known to the art, a complete illustration and description of these parts does not seem necessary.

Referring to Fig. 4, an enlargement of the cross-section of the fluid coupling has been shown. It will be noted that a cage 101 is attached to the pump 21 for rotation therewith. A number of plungers 102, which can slide in the bore provided by the cage, normally are spring pressed toward the inner surface of the pump by springs 104, part of which surrounds stationary pegs 105 and part of which fits within the hollowed-out plungers. When the pump is stationary or rotating at a relatively low speed, the springs 104 are of such strength as to maintain the plungers in the position shown both in Figs. 1 and 4. However, when the pump is rotated at such a speed that centrifugal force will overcome the strength of springs 104, the plungers 102 are moved radially outwardly until they are retained substantially within the cage. It will be understood that a considerable number of plungers so constructed are mounted about the pump, the purpose of these plungers being to obstruct or impede liquid flow from the turbine to the pump so that at low pump speeds coupling action is effectively prevented, with the result that parts driven by the runner have practically no torque applied thereto, and creeping of the vehicle at idling speed is prevented.

In Fig. 5 a valve body of the type associated with the last unit from which the propeller shaft extends has been shown. Body 110 has a bore 111 therein which is provided with an enlargement 112; a second enlargement 114 connected to the outlet conduit 115; enlargement 116 connected by passage 117 to chamber 118 and enlargement 119 connected to conduit 120. The purpose of these various conduits will be described in detail in the explanation of the operation of the entire mechanism. The valve member 121, slidable in this bore 111, has a plurality of indentations 122 near the lower end thereof which can be engaged selectively by one or more spring-pressed balls 124. This valve member also has spaced lands 125 and 126. The lower end of the valve has a groove 127 therein, to be engaged by a pin 123 at the end of a crank arm 128, rotatable about a shaft 129 for imparting movement to the valve within the bore.

The body 110 also has a bore 125' therein, restricted as at 126', 127' and 128'. The space between restrictions 126' and 127' is connected to a conduit 129', while the space between restrictions 127' and 128' is connected to a conduit 130, also connected to the space defined by the restriction 128'. A valve member 131 has a collar 132 thereon and is provided with lands 134 and 135, and has spring 133 surrounding it below collar 132.

Mounted within the chamber 118 is a valve seat 140, against which is seated a valve 141 in the nature of a multi-cornered disk, the corners of which center the valve within the bore of the chamber 118, but at the same time the configuration is such that, when the disk is seated against the member 140, passage of oil in either direction is prevented. Member 141 is normally held in seated condition by spring 142 pressing thereagainst and surrounding a peg 144. An outlet conduit 145 extends to an accumulator 146, the function of which will be described later.

A second chamber 147 has a check valve member 148 mounted therein and is normally held against movement in one direction by a spring 149. Chamber 147 is connected to chamber 118 by passage 150; is connected to a conduit 151; and also has the end thereof beyond the valve 148 connected to one of the enlargements of the bore 125' by a passage 152. The purpose of describing this mechanism in the foregoing detail in connection with Fig. 5 is merely to describe the parts in a showing larger than the diagrammatic showing of Fig. 11, but the operation of these parts will become apparent in the description of Fig. 11.

Fig. 6 is an enlarged showing of the servo which operates to apply and release the band or brake 57 on the rear drive unit described in connection with Figs. 1 and 2. The servo comprises a housing having two chambers 155 and 156. Chamber 155 has an operating rod 157 extending therefrom, which rod is secured to a piston 158. Piston 158 is spring-pressed to the left by springs 159 and 160. Chamber 156 has extending therefrom into chamber 155 a rod 161 which is hollowed out and apertured to permit the passage of oil from the interior of the first chamber into the interior of the second chamber. Rod 161 is secured to piston 162, normally forced to the left by springs 164 and 165. Conduit 166 is in communication with the interior of chamber 155 to the left of piston 158, while a branch 167 from this conduit is in communication with the chamber 156 to the left of piston 162. Another conduit 168 communicates with the interior of chamber 155 within the space formed as shown, whereby fluid can be introduced into this space to force piston 158 to the left. It will be noted that fluid so acting also passes through the hollow rod 161 into a space in the second chamber to force piston 162 also to the left. Rod 157 cooperates with linkage 157′ to apply the band 57 to drum surface 56 in conventional fashion. The operation of this servo will be better understood in the detailed description which will appear later.

Fig. 7 is an enlarged showing of the servo utilized for applying and releasing the band or brake 42 associated with the first driving planetary unit described in Figs. 1 and 2. The servo of Fig. 7 is constructed to provide a chamber 170 through one end of which extends a rod 171 secured at the other end to a piston 172. This rod is hollowed out as shown for the passage of fluid from a zone adjacent piston 172 to another zone adjacent a second piston 174, also attached to the rod 171. A third piston 175 is secured to the rod 171 intermediate the pistons before mentioned. A combined partition, spring seat and guide 176 is mounted within the chamber. Springs 177 and 178 cooperate to move the rod 171 inwardly of the servo away from the drum 41 and thereby to relieve band pressure on the drum in the absence of fluid pressure in opposing direction. Conduit 180 is connected to the housing to admit fluid thereinto to set against piston 175, and conduit 181 admits fluid to the housing to act against one surface of piston 172 and, due to the passage in rod 171, also to act against the end surface of piston 174. Conduit 182 extends into a bore 184, in turn connected by line 185 to the opposite side of piston 172. Valve member 186 is slidable in bore 184 and is held against rotation therein by a pin 187, extending through an elongated slot in the valve. A restricted passage 188 permits fluid to pass through the valve 186 from conduit 182 to the line 185 when the piston is in position to register the restriction with the proper openings. Another conduit 189 communicates with the bore 184 below a land 190 of the valve 186.

In Fig. 8 a part of the control valve body structure and valves mounted therein has been shown. Inasmuch as this type of structure is well known to the art, and the operation thereof follows more or less conventional lines, it is believed unnecessary to go into a detailed description of the exact construction of each valve, since the operation thereof will be apparent from the operational description which will appear later. It is believed sufficient at this time to point out that the valve body has mounted therein the usual manual control valve 200 which has a plurality of lands thereon, and which fits for sliding movement in a bore having a plurality of ports. The manual valve can be moved under the control of the operator into any one of four positions which are denoted by the circles appearing adjacent the end of the valve. For example, the circle marked N is the position at which the valve will be located when the transmission is in neutral condition. The second position, marked F-1 (or "Automatic"), which is the position of the valve in Fig. 8, is the driving range, i.e., the position for normal forward propulsion of the vehicle with the controls thereof automatically causing shifts in response to throttle valve and governor pressures. The third position, marked F-2 (or "Hold"), is indicative of the position of this valve when it is desired to lock the transmission in the ratio in which it may be operating and the time the manual valve is moved to this position to prevent excessive ratio changing or "hunting" when operating in certain hill or traffic conditions.

The fourth position, marked R, designates reverse position of the manual valve for insuring operation of the transmission to impart backward movement to the vehicle. In addition to the manual valve, use is also made of a throttle valve composed of parts 201 and 202 longitudinally separated by a spring 204 with the part 202 having a stem slidably guided in the part 201. The usual throttle actuator 205 serves to move the part 202 and, under proper conditions, the part 201. A compensator valve 206 and a double transition valve 207 are also provided and, in addition, a front valve 208 is included for certain specific functions when the transmission is in reverse gear. Various ports are provided in the valve body, some intercommunicating internally of the body and some being connected to external fluid lines or to other parts of the valve structure, which communication can best be represented by lines which apparently extend outwardly of the body.

Another part of the control valve body has been shown in Fig. 9 wherein three governor plugs 210, 211 and 212 are shown as being slidably mounted and are associated respectively with shift valves 214, 215 and 216. These shift valves in turn are in operative relation respectively with regulator plugs 217, 218 and 219. Springs of various strength are interposed between the respective shift valves and their associated regulator plugs. It will be observed that the valves and plugs are mounted for sliding movement in bores provided with ports, some intercommunicating with other ports in the body, some communicating with external fluid lines, and some being connected to exhaust, the latter being marked "Ex." The flow of fluid in this valve body will be better understood by the detailed operational explanation appearing later.

An enlarged illustration of one of the governors used in this invention has been shown in Fig. 10. The governor is of well-known type, and hence it is believed that a brief description thereof will suffice.

The body of the governor is provided with a bore in which a valve member 225 can reciprocate, being forced outwardly by centrifugal force acting on the weight 226 secured to the end of the valve member. It will be noted that this member 225 has portions of different diameters which can operate to close or open ports formed in the valve body. A similar member 227 is also mounted for reciprocation in the body and has a weight 228 at the outer end thereof, which weight is lighter than the weight 226. Fluid can be introduced to the body through the line 229 which is branched as at 230 and 231 in such fashion that fluid can be introduced to ports associated with the respective valve members and their weights. Normally, when the governor is at rest, the larger ends of the members 225 and 227 are in close proximity to each other, with the weights 226 and 228 retracted.

As the body is rotated, centrifugal force tends to move the weights outwardly and, since the weight 226 is heavier than weight 228, its outward force is larger. At rest, the port communicating with line 230 is closed by the smaller part of member 225, but when this member is moved radially outwardly this port is uncovered so that fluid enters the space between the large and small parts of the valve member. Due to the difference in diameters in these parts, when the oil delivered to the transmission reaches a pressure sufficient to overcome the force exerted by weight 226, this pressure will force the valve 225 inwardly until some of the oil is exhausted through the branch of passage 234 and discharge port 236. This action of centrifugal force opposing oil pressure serves to regulate the outgoing volume of oil through the line 235 so that the pressure of the delivered oil is dependent upon the degree to which the valve assembly is moved radially outwardly. Thus the pressure of oil delivered by this part of the governor is responsive to the speed of rotation of the governor, and the governor is driven by the output shaft of the transmission mechanism, with the result that governor pressure, in this instance G–1 pressure, varies in proportion to vehicle speed.

The same action occurs in the other part of the governor, with the result that fluid, entering the bore from line 231, passes therefrom through the passage 237 to the delivery line 238 and thence to the transmission mechanism. Since the weight 228 is lighter than weight 226, it follows that the pressure delivered from this part of the governor is proportional to vehicle speed but is less than G–1 pressure, or in other words, as output speed increases, G–2 pressure is increased at a slower rate than is G–1 pressure.

It is believed that the sequential operation of the parts of the mechanism which have been described previously and in unassociated relation will be better understood by the following description of the functioning of the apparatus in the course of normal operation thereof. Since in most mechanisms of this type provision is made for preventing starting of the engine when the transmission is in other than neutral position, let it first be explained the mode of operation of the transmission in neutral.

*Neutral*

The manual valve 200 (Fig. 8 and Fig. 11) is moved to the N or neutral position. When the engine is started and permitted to run at idling speed, the output thereof drives the pump 21 of the fluid coupling and also the variable capacity pump 33. As long as the coupling pump 21 is rotating at engine idling speed, the plungers 102 therein will remain in the position shown in Figs. 1 and 4; and due to the disposition of a plurality thereof about the pump, such flow of fluid in the coupling as would cause rotation of the turbine 22 is reduced. The variable capacity pump 33 draws oil from the sump through line SL and, after any demands for high pressure oil are met, delivers oil to the fluid coupling through line CL to fill the same and also to supply lubricant throughout the mechanism. Oil is also delivered to the servo for the rear unit through the following path: from the outlet PL of pump 33 through line 301 to the manual valve body, but since land 250 of the manual valve in neutral blocks the port directly in line with 301, fluid is diverted to the branch 302 from which it passes through line 304 to the inlet 166 and branch 167 of the rear servo. This fluid, acting against pistons 158 and 162, draws rod 157 inwardly against spring pressure and thereby releases the band or brake 57 applied to the rear driving planetary unit. Land 251 of the manual valve in neutral position closes the port connected to line 308 so that fluid entering the valve through line 302 can only exit through line 304. Likewise in neutral position, land 252 of the manual valve closes the port connected to line 310 which constitutes a branch of supply line 301 so that line pressure is arrested at this land.

High pressure oil from the pump 33 is also supplied through conduit 255 to a port in the valve body of Fig. 9, and thence through passage 256 to a land on the shift valve 214, at which point it is arrested. It will be noted in Fig. 11 that the line 255 is extended to the lower mechanism to supply branches 301', 310', and also the line 151 which leads to the chamber 147 of the accumulator valve body (shown also in Fig. 5). From this chamber the oil passes through the passage 150 to unseat valve 141, thereby supplying line 145 connected to the accumulator. Flow of oil through passage 117, also connected to the chamber 118, will be discussed later.

High pressure oil is also supplied through the pipe 229 to the governor associated with the upper mechanism and through pipe 229' to the governor associated with the lower mechanism. These two governors are driven respectively by the output shafts 65 and 65' of the two units, and these output shafts are stationary in neutral position; hence, the governors are also stationary and there will be no output from either.

The clutch for the rear driving unit of the upper mechanism (composed of clutch plates 39 and 44) is exhausted through the line 309 which extends to the shift valve body (Fig. 9) and a port adjacent to the shift valve 215, at which location it is exhausted. Branch 308, which extends from line 309 to a port in the control valve body, is also connected to this same exhaust connection. The front clutch, i.e., the clutch having plates 39 and 44, is released or connected to exhaust through line 314, which is a branch of line 315, through line 315 which extends to the manual valve body adjacent to double transition valve 207, through the line 316 also at the double transition valve to the shift valve body and thence to exhaust through a passageway in the body which terminates at the shift valve 214. The supply line for fluid to actuate the front servo to apply the band 42 consists of line 311 from the manual valve body which extends to the valve body of a front valve 208, and thence through line 312 to connection 182 at the front servo. In neutral position, this passage is deprived of oil since the land 252 closes the port connected to line pressure conduit 310, the only supply line for line 311.

The thereinbefore described hydraulic circuits condition the apparatus for neutral operation in that the front servo, which is fluid pressure applied and spring pressure released, has no oil supplied thereto and, hence, is in released condition due to spring action, as described in connection with Fig. 7. The front clutch is in released or exhausted condition in the manner previously described. The rear servo, which is spring applied and fluid released, has fluid supplied thereto as before pointed out, to cause a release of the rear band 57. The rear clutch is also released or exhausted, as before described, so that in each of the two driving units made up of the two planetaries, no parts of either offer reaction to other parts and, therefore, there is no transfer of torque or power through these two units. While the desciption just completed has been devoted principally to the upper transmission mechanism, similar circuits are provided for the lower transmission mechanism which is also conditioned for neutral simultaneously.

In the operation of this particular invention, it is contemplated that the operator, before shifting the manual valve to F–1 range, will determine whether it is preferable to operate the mechanism with the final drive unit either in reduction ratio or in direct drive. If the load on the vehicle is extremely heavy, requiring high starting torque, or if the vehicle must traverse a relatively heavy grade, the operator will in all probabilities elect to utilize the reduction ratio of the last unit. It will be noted by reference to Figs. 5 and 11 that the selector valve, having land 126 thereon, is capable of assuming either one of three positions as determined by the spring pressed ball 124 engaging selectively one of the detent grooves 122. If the central groove is so engaged, land 126 will effectively close the opening 116 connected to the passage 117, in which event fluid under pressure from the pump into the chamber 118 and under pressure from the accumulator is arrested at this land. If the lower groove 122 is engaged by the ball, the land 126 will be in the position shown in Figs. 5 and 11; in which position the fluid under pressure, both from the pump and the accumulator, will pass from the passageway 117 into the bore of the valve and out through line 115 to the direct clutch made up of clutch plates 90 and 92. If the upper indentation 122 be engaged by the ball, the land 126 will be moved to a downward position permitting the fluid from passage 117 to leave the casing through line 120 to the reduction cone brake made up of the parts 96, 97 and 98.

*F-1 or automatic range, first gear*

The operator, having determined the condition of the rear unit to be employed and operated a manual control to effectuate that condition, under ordinary conditions will move the manual valve to the F-1 position. The manual valve 200 is moved to the position shown in Figs. 8 and 11. Such movement deprives line 304 of pump line pressure previously supplied through the branch 302 from the line 301. At the same time, the pump supply line 310 is opened and, in addition, supply line 301 is opened. Fluid under line pressure from the pump is supplied through the line 310 to the manual valve, thence through line 311 to the front valve 208, now held open by the end of the manual valve, and through a passage in the body of this valve to the line 312 which leads directly to connection 182 at the front servo, applying pressure to piston 172, which pressure is sufficient to overcome the resistance of the springs in the servo and to force the rod 171 outwardly from the servo to apply the band 42 about the drum surface 41. This action locks the sun gear 37 against rotation. Simultaneously, the fluid, previously described as acting to release the rear servo, is exhausted from the outlet 166 and branch 167 through line 304 to the manual valve body and thence through line 308, which is connected by branch line 309 to exhaust at the shift valve 215 (Fig. 9). Exhaust of this fluid from the rear servo permits the springs therein to apply pressure to lock the rear band 57 about the surface 56 of drum 55, which action locks ring gear 54 against rotation. The front clutch is still exhausted or released, as described in connection with the neutral condition, and the same is true of the rear clutch.

The two drive units comprising the upper mechanism are now in condition for first speed operation in that each unit is in reduction with their bands applied and their clutches released. However, since the engine is still operating at idling speed, very little drive or transmission of power takes place since, as before described, the turbine 22 is stationary due to the relatively small oil circulation through the fluid coupling, which circulation is retarded by the plurality of plungers 102. It will be understood that the lower unit is conditioned for first speed operation simultaneously with the conditioning of the upper unit so that both mechanisms are now ready for the transmission of driving force. Such action is accomplished by accelerating the engine. As soon as the engine and, consequently, the coupling pump 21, reach a predetermined rate of rotation, centrifugal force causes the plungers 102 to move outwardly, clearing the pump passages for the circulation of fluid in the usual manner. When the turbine 22 tries to rotate it transmits torque to the carrier 24, the planets of which engage the sun gear 25 and the ring gear 28. The vehicle being stationary, these latter two gears, due to their connection through the upper and lower mechanisms with the propeller shaft are stationary and offer mutual reaction to the carrier and its planets and the coupling turbine. As the vehicle starts to move the two gears 25 and 28 will rotate at a rate dependent on the ratio of gearing 30, 31 and 32 and gearing 80, 81 and 80', and carrier 24 and turbine 22 will move in the same sense as the coupling pump 21. Rotation of sun gear 25 causes rotation of ring gear 27 through the stepped shaft 26. Since sun gear 37 is locked against rotation by the front band 42, it follows that rotation of ring gear 27 causes rotation of carrier 35 and, consequently, rotation of sun gear 59 of the second unit connected to the carrier 35 by the shaft 36. Ring gear 54, being locked against rotation by the rear band 57, rotation of sun gear 50 will cause rotation of carrier 64 and, consequently, output shaft 65 of the upper mechanism. Gear 80 is attached to this output shaft and therefore rotates at the same speed. The reverse unit is idling during this operation. Since each of the two planetary drive units in the upper mechanism has one of its components locked against rotation, the result is drive at a reduction ratio through each unit with an end result of compound reduction. This is the highest reduction ratio possible with the mechanism and creates the lowest output shaft speed in relation to input speed possible with the compound gearing.

At the same time the upper mechanism is put into operation, as just described, the lower mechanism is likewise affected by rotation of the ring gear 28 which, through sleeve shaft 29, rotates gear 30, idler 31 and gear 32, connected by the stepped shaft 26' to the ring gear 27'. Since the lower mechanism is identical in construction with the upper mechanism, it follows that the output shaft 65' is also caused to rotate, but at a different speed of rotation from the shaft 65. The difference in rotative speeds of these two shafts is caused by the difference in number of teeth of gears 80 and 80', which difference is predetermined to obtain the best results. Since idlers are provided in both the front and rear gearing, it follows that the parts of the upper and lower mechanisms rotate in the same direction, which makes possible utilization of servos and bands of the same construction. It will be obvious, however, that the idlers could be omitted if desired, in which event the two output shafts would rotate in opposite directions, which would necessitate slight changes in various parts of the mechanisms.

If the operator has elected to utilize reduction ratio in the final unit, the selector valve associated with this unit will have been operated to cause engagement of the uppermost groove 122 with the ball 124 as the result of which, fluid supplied both by the accumulator 146 and the pump to chamber 118, as previously described, will pass through the passage 117 into the bore of the valve and out through pipe 120 to operate the reduction cone by forcing the piston 99 to the right (Fig. 1), which locks the cone 96 against the surface 97. Output shaft 65' rotates sun gear 85 which in turn rotates the planets of carrier 86 and, due to braking of ring gear 88 in the manner just described, rotation of these planets causes rotation of the carrier 86 at a reduced speed relative to shaft 65'. Carrier 86 is connected directly to propeller shaft 87 and, therefore, imparts rotation to this shaft which extends to the axle of other driving parts of the vehicle.

Should conditions be such as to warrant operation of the final unit in direct drive instead of in reduction ratio, the selector valve 121 would be moved to its other extremity, in which event the fluid supply through passage 117 would exit from the valve bore through line 115 which extends to supply fluid to piston 94 which, when operated, locks the plates 90 and 92 together, thereby locking ring gear 88 and sun gear 85 together. Under these conditions, rotation of the ring gear causes rotation of carrier 85 without any relative rotation of the planets thereof, so that the carrier 86 and propeller shaft 87 rotate at the same rate of speed at output shaft 65'.

When the two output shafts 65 and 65' have rotation imparted thereto, the two governors connected and driven respectively thereby are also rotated so that fluid under G-1 pressure passes through line 235 into the shift valve body of Fig. 9 into contact with the governor plug 210. A branch 260 from line 235 supplies fluid under G-1 pressure to the right end of the enlarged part of shift valve 215. Another branch 261 leads to a reverse blocker 262, the piston 264 of which is moved by this fluid to cause an interengagement of parts of the manual selector mechanism in such fashion that, when the fluid under G–1 pressure reaches a value representative of a relatively low vehicle speed, the manual mechanism cannot be operated to place the transmission mechanisms in reverse position. This type of reverse blocker is well known to the art and requires no detailed description. Branch 189 from line 235 leads to the front servo to operate valve 186 under certain conditions to be detailed later.

The governors also build up G–2 pressure but at a slower rate, and the manner in which G–2 pressure is utilized will be explained later.

Line 235′, having G–1 pressure therein from the governor of the lower mechanism, also has a branch 265 which extends to the reduction lock 266 associated with the manual valve controlling operation of the final unit. When the pressure in line 265 reaches a predetermined value, piston 267 in the lock is moved to the right (Fig. 11), eventually forcing a plunger 268 outwardly into the path of movement of the crank 128 so that change of position of this crank is prevented. In this manner, a shift from direct drive in the final unit to reduction drive is prevented above a predetermined vehicle speed.

As the engine throttle is opened beyond idle, the throttle extension 205 moves valve member 202 to the left (Fig. 8), placing spring 204 under compression, which tends to move the valve 201 also to the left. Oil under pump pressure is delivered by passage 320 from the bore of the manual valve 200 to the bore in which valve 201 slides. Movement of member 201, under the impetus of spring 204, opens a port into the passage 221 and also permits the fluid entering this passage to be introduced to the left of the land which uncovered the port, thereby to counteract, to some extent, the action of spring 204. This arrangement constitutes the well-known throttle valve device which operates to provide fluid under regulated pressure proportional to or responsive to throttle opening. Fluid from the passage 221 is conducted to the shift valve body to be employed in conjunction with the regulator plugs 217, 218 and 219.

Line 221 connects with an internal passage 400 (shown in dotted lines, Fig. 9) which leads to a channel 401 extending to a bore 402 in which is slidably mounted a tubular valve member 404. The valve member is made by drilling out solid stock to provide a cup-like cavity in the left end to retain a spring 405, and a second cavity in the right end which is provided with a through-diametric opening 406. Diametrically opposite parts of the left-hand cup wall are provided with slots 407. When oil enters the passage 400 and is directed against the right-hand end of the valve, this valve is moved to the left to compress spring 405 and to align the through-opening 406 with internal channels leading to the rear of the regulator plugs 218 and 219 and to the larger part of plug 217. When the throttle valve pressure is sufficiently high, plug 218 moves to the right, opening passage 408 to permit modulated throttle valve pressure to be applied to the rear of the large end of shift valve 215. Likewise, when plug 219 has been moved to the right by TV pressure, passage 409 is opened to permit modulated throttle valve pressure to be brought into play against the large end of the shift valve 216. Pressure against the larger area of plug 217 moves it also to the right, permitting regulated modulated oil pressure through channel 410 to be applied to the large end of shift valve 214. The effect of such pressure will be clarified in the later description of the operation of the device.

Oil under throttle valve control is also supplied through line 222 to the left of compensator valve 206. Oil supplied to the bore of the throttle valve 201 is also delivered to the compensator valve 206 and the plug 269, appearing at the right end of the compensator valve. Oil under throttle valve pressure moves the compensator valve to the right while oil under pump pressure moves the plug 269 in the same direction until arrested by the stop 270. Such movements as shown in Fig. 8 permit oil to pass through the bore of the compensator valve to line 271 which extends to the connection 168 at the rear servo and which has a branch 272 which extends to connection 180 at the front servo. Bypass 274 in the manual valve body routes oil to the right of the plug 269 to exert pressure to move this plug and, consequently, the compensator valve to the left. This arrangement is conventional for obtaining regulated compensator fluid responsive to variations in throttle valve pressure.

The purpose of supplying fluid under compensator pressure to the two servos is to augment the forces which act to cause these servos to apply the front and rear bands to their respective drums for locking the same against rotation. As before mentioned, the rear servo is spring applied and oil released so that it becomes desirable to assist the springs in applying the rear band as torque is increased. This additional oil obviates the necessity of increasing the size of the servo and its springs should spring action alone be employed. The fluid under compensator control introduced into the front servo acts on the piston 175 to assist the pressure acting on piston 172 in moving the rod 171 outwardly into band-engaging position. Thus it will be seen that, as the engine is accelerated with the transmission in first speed, force to lock the two bands is increased proportional to the throttle opening.

The lower mechanism also operates to drive two additional pumps. One of these pumps 275 serves to scavenge oil from the final unit sump by line 276 and to return it to the transmission sump through line 277. The other pump 278 draws oil from the transmission sump through line 279 connected to supply line SL and delivers it through line 280 to the connection 130 in the valve body shown in Fig. 5. This fluid is introduced to the top of the land 135, and also through the branch line shown, to the bottom of this land and the top of land 134.

Oil delivered to the top of land 135 serves to move the valve against the resistance of spring 133 until, under predetermined pressure, the valve is moved to such an extent that oil can be returned to the inlet of the pump through line 129′ connected to inlet line 279. The spring 133 is of a strength to cause this valve to act as a regulator, holding the output of the pump to a value of, for example, from 105 to 115 lbs. per square inch. The output of the pump also passes through channel 152 to the valve 148 and, when the rear pump pressure exceeds the front pump pressure delivered through line 151, the valve 148 is opened, permitting the oil from the rear pump to flow to the front pump and, in some conditions, to take over the work of the front pump in supplying the hydraulic mechanism. Oil entering chamber 147 also passes through valve 141 to the accumulator and to channel 117 for use in operating the pistons of the final unit.

*Shift from first to second in each mechanism*

The transmission will continue operating in first speed ratio until conditions are reached which render a shift to second speed ratio desirable. As before pointed out, this particular control system for the associated transmission is designed for operation in conjunction with an engine which has a governor to limit the speed of rotation thereof due to fuel feed to the engine. Furthermore, the various springs and surface areas in the shift valves acted upon by fluid pressure are so calibrated that a shift from a lower speed ratio to a higher speed ratio occurs only when the vehicle attains a speed resulting from full throttle operation of the engine during the lower ratio. Due to this calibration it will be obvious that maximum throttle valve pressure is supplied to the various shift valve trains during operation in each ratio, with the result that this maximum pressure plug the strength of the shift valve spring must be overcome by governor pressure resulting from output shaft speed of rotation to operate the shift valve in upshifting.

When the output shaft 65 of the top unit has attained a speed which, due to its driving the governor, causes the G-1 pressure of this governor to exceed the force exerted by the springs associated with the 1st to 2nd shift valve 214, the full throttle pressure acting on regulator plug 217, and modulated throttle pressure on the large end of valve 214, G-1 oil pressure through line 235 to the governor plug 210 will move this plug to the left until the land on the shift plug 214 clears the port connected with the passage 256 in the valve body. Oil under pump pressure supplied to passage 256 by line 255 then flows through an internal passage in the shift valve body to the line 316 which extends to the double transition valve 207, from which the oil passes through line 315 and connection 181 to the front servo and through branch 314 to the front clutch. The oil reaching the front servo acts on piston 172 and, through the passage in rod 171, also acts on piston 174 to move the rod 171 inwardly to release the front band 42. Oil is still being supplied to the other surface of piston 172 and is being supplied from the compensator valve against piston 175, but the piston areas are such that these release pressures and the springs will overcome both apply pressures. This action retains band-apply pressure available for use but overbalanced by band-release pressure and spring action. Simultaneously, the front clutch is actuated to lock the plates 39 and 44 together, which locks the planets of carrier 35 to the sun gear 37 of the front driving unit in the upper mechanism. Since these gears are locked together, it follows that rotation of the ring gear 27 causes rotation of the planets and sun gear 37 at the same rate or, in other words, the front unit operates in direct drive. Status of the rear unit remains unchanged so that the output shaft 65 is driven by the carrier of the rear unit as before, but with the single reduction afforded by the rear unit. Thus it will be seen that the upper mechanism is operated with the front unit thereof in direct drive and the rear unit in reduction, which provides a higher speed ratio than was obtained when both units operated in reduction.

In this embodiment of the invention the output shaft of the upper unit must rotate at a higher rate than the output shaft of the lower mechanism, even though these two mechanisms are in the same speed ratio condition. Consequently, since changing of gear ratio takes place in response to vehicle speed, as represented by the speed of rotation of the output shafts, and torque demand, as represented by throttle valve pressure, the upper unit will shift from first to second gear ratio while the lower mechanism will remain in first gear ratio. Due to the geared connections between the output shafts, the change in gear ratio in the upper mechanism causes a change in the speed of rotation of the ring gear 27, and, consequently, of the sun gear 25 of the differential planetary unit. Since this planetary unit can operate to provide differential drive, it will be seen that the input to the upper unit has its speed properly varied to accommodate the upper mechanism for operation in second gear, while the lower mechanism is still operated in first gear.

As the speed of rotation of the lower output shaft 65' increases, a point will be reached at which torque demand and vehicle speed will cause this lower mechanism also to shift into its second gear ratio, which shift is accomplished in exactly the same manner as just described in association with the upper mechanism.

*Shift from second to third in each mechanism*

As the speed of rotation of the two output shafts, 65 and 65', increases with the same relative differences maintained, the G-1 pressure from the governor of the upper mechanism will reach a value of such magnitude that, when applied to the large area of the 2nd to 3rd shift valve 215 through the line 260 combined with G-2 pressure from the same governor applied to the regulator plug 211, the pressures will cause a shift from second to third gear ratio in the upper mechanism. The G-2 pressure is supplied by line 238 from the governor and branched to lead both to the regulator plug 211 and to the right end of the shift valve 215. These two governor pressures, at a proper time, will combine to exceed the full throttle valve pressure acting on the regulator plug 218, modulated throttle valve pressure on the valve 215, and also the strength of the springs acting on the large area of the shift valve. When this occurs, valve 215 is moved to the left. The rear clutch, which was previously released or exhausted, now becomes closed by oil under pump pressure from line 301 to the manual valve bore, then line 306 therefrom to the branch 307 leading to the shift valve body, the bore of the second to third shift valve and therefrom through the line 309 to the rear clutch. At this point the oil acts on piston 60, compressing plates 52 and 59 against the buttress 62, so that, when the clutch is fully engaged, the sun gear 50 is effectively locked to the ring gear 54. Simultaneously, oil leaving the shift valve body through line 309 progresses through line 308 to the bore of the manual valve body and thence through line 304 and the conduits 166 and 167 at the rear servo. Oil from these conduits acts on the two pistons 158 and 162 to move the rod 157 inwardly of the servo thereby to release band 57 from drum surface 56. Oil flowing through line 304 is partially diverted to branch 305 to the right end of the double transition valve 207. Since the area of the valve 207, against which oil from line 305 impinges, is larger than the area subject to pressure from the line 274, it follows that the valve 207 is moved to the left until the port communicating with line 316 is closed and a port communicating with line 340 is opened. Closing of the port leading to line 316 cuts off the supply of fluid through lines 315 and 314, which caused the release of the fron. band and the closing of the front clutch, respectively. Opening of the port connected to line 340 permits these devices to be exhausted through branch 314, line 315, the bore of the double transition valve, and line 340 to exhaust at the bore of the shift valve 216. When the band-apply pressure of oil is exhausted through the line 315 from the front servo, this device is immediately actuated to apply the front band, since the supply of fluid thereto through line 312 had been maintained during operation of the mechanism in second speed ratio. However, if the pressure of fluid from the governor, i.e. G-1 pressure, supplied to the valve 186 in the front servo through line 189 is sufficiently high to move this valve in its bore, the reapplication of the front band will be somewhat retarded since oil for that purpose must pass through the restriction 188 in valve 186. This prevents the band being applied in too abrupt fashion since, in the shift from second to third, a double transition takes place. In other words, a transition takes place both in the front unit and in the rear unit of the upper mechanism. The front unit is shifted from direct drive to reduction drive, while the rear unit is shifted from reduction drive to direct drive. Thus it will be seen that the transmission of power through the two units is as follows: the band 42 being applied, sun gear 37 is locked against rotation so that rotation of ring gear 27 causes rotation of the planets of the carrier 35 and also rotation of this carrier at a reduced rate. Such rotation is imparted directly to the sun gear 50 of the second unit and, since it is in effect locked to the ring gear 54 by the rear clutch, the carrier 64 must, of necessity, rotate therewith. Third speed, therefore, represents reduction drive in the front unit and direct drive in the rear unit.

It will be understood that the change in gear ratio in the upper mechanism from second to third occurs while the lower mechanism remains in second gear. However, as soon as the vehicle speed increases to the proper degree, the lower mechanism will also shift into third speed ratio so that both mechanisms for a time will be in the same condition.

*Shift from third to fourth in each mechanism*

When the vehicle speed is increased sufficiently, the second regulating valve in the governor will supply G-2 oil pressure through the line 238 and a branch 281 to the large area of the 3rd to 4th shift valve 216 and also through a branch 282 to the outer end of the governor plug 212. When the pressure so suplied is sufficient to overcome the spring acting on the shift valve as augmented by full throttle valve pressure and modulated throttle valve pressure, the shift valve 216 will be moved to the left to uncover a port connected to the branch 321 connected to the line 306 which derives oil from the pump 33. Uncovering of this port permits oil under line pressure, and supplied by branch 321, to traverse line 340 to the double transition valve and from the bore of that valve through the line 315 and branch 314 again to release the front band and simultaneously apply the front clutch. This action is identical with that described in connection with the shift from first to second. The rear servo and the rear clutch remain in the condition established for third speed operation.

In this fourth speed ratio of the upper mechanism it will be found that the front unit thereof is in direct drive and that the rear unit also is in direct drive so that the output shaft 65 rotates at the same speed as the input ring gear 27.

The shift from third to fourth, taking place in the upper mechanism, occurs while the lower mechanism is still in third speed condition but, as the vehicle speed increases, eventually the lower mechanism likewise will automatically shift to fourth speed condition, following which the transmission will continue operating with the two mechanisms in the same condition but with the upper mechanism rotating at a faster rate than the lower mechanism. Such difference is permitted by the differential drive afforded by the planetary unit operated by the coupling device.

In this particular transmission which, as before mentioned, is intended for heavy duty service, the controls have been arranged so that, should the vehicle speed drop below that required to sustain operation in any particular gear ratio, the drop in governor pressure caused by the retarding of vehicle speed will reduce the pressure applied to the governor plugs in such manner that spring pressure and throttle valve pressure opposing governor pressure can overcome governor pressure and automatically down-shift one of the mechanisms to the next lower ratio. For example, if both mechanisms are in fourth speed ratio and the vehicle speed drops, the first effect will be a decrease in governor pressure to the 3rd to 4th governor plug 212' (not shown) so that the 3rd to 4th shift valve 216' will be moved to its extreme right-hand position by spring pressure and throttle valve pressure acting on the plug 219', and modulated throttle valve pressure acting on the left-hand end of the shift plug. This will restore the lower mechanism automatically to third speed condition, causing the planetaries to be actuated for that purpose. It will be obvious that further decrease in vehicle speed will cause progressive downward shifting of the two mechanisms at staggered intervals in the direct reverse order of their upshifting. It will also be evident that the downshifting can occur at any speed ratio established for the entire transmission.

While the description of the operation of the mechanisms in driving range has been devoted principally to the upper mechanism, and the speed ratios have been described in their proper order in this mechanism, it will be obvious that the entire transmission has a range of speed ratios which results from the difference in relative output shaft speeds. The following table will exemplify the actual operating conditions:

| Overall Transmission | Upper Mechanism | Lower Mechanism |
|---|---|---|
| 1st | 1st | 1st |
| 2nd | 2nd | 1st |
| 3rd | 2nd | 2nd |
| 4th | 3rd | 2nd |
| 5th | 3rd | 3rd |
| 6th | 4th | 3rd |
| 7th | 4th | 4th |

From this table it will be seen that two parallel four speed mechanisms, having their inputs differentially driven and having their outputs maintained at a predetermined different speed ratio, will provide an overall transmission having seven speed ratio changes possible therein.

*F-2 or "hold" range*

In the operation of heavy vehicles, the terrain being negotiated, particularly a succession of upgrades and downgrades, may make it desirable to operate the transmission in a particular speed ratio and to prevent the transmission from automatically shifting from a lower speed ratio to a higher speed ratio. For example, should the transmission be operating in third speed ratio it may be desirable to prevent it from shifting to fourth speed ratio under normal operating conditions. The present invention makes possible such procedure, provision being made to hold the transmission in the selected ratio and to prevent a shift to the next higher ratio so long as the transmission does not attain a speed which would be the result of or cause the engine to rotate at a higher than governed speed. The engine driving this particular transmission may be under the control of a governor which limits to a maximum the driving speed thereof. Such governors are well known and, as an example thereof, without any limitation on the type of governor, reference is made to Patent Number 2,270,100 issued January 13, 1942 to Adler et al. for Centrifugal Governor. However, should the transmission rotate at such a higher speed which would be communicated to the engine, governor pressure developed at this speed will be sufficient to cause the transmission to shift into the next higher speed ratio before engine speed could become great enough to endanger the engine itself.

To perform this operation the operator moves the manual valve to the right to register with the F-2 position shown in Fig. 8. This movement causes the land 252 to uncover, at least partially, a port leading to line 331 extending to the throttle valve auxiliary located in the shift valve body. In this condition oil from the pump 33 is supplied by the line 301 and branch 310 thereof to the bore of the manual valve and therefrom through the line 331 to cause the application of full line pressure to the plugs 217, 218 and 219. Oil, entering the body through line 331, passes through one or more of the slots 407 in the valve 404, aiding spring 405 in moving this valve to the right. Such movement of the valve 404 to the right permits oil to pass through the diametrically opposite slots in the left-hand cup and through channels shown to act on all three regular plugs, 217, 218 and 219. Full line pressure having been applied to these three plugs and also to the shift valves 214, 215 and 216 through the channels 410, 408 and 409 respectively, it follows that extremely high governor pressure would be necessary to move these shift valves to the left.

The valve body springs, valve areas, and pressures are so calibrated that, in this F-2 or "Hold" range, the upshifts will occur only if and when the vehicle has attained a speed which makes the engine run considerably faster than its maximum governed speed. This driving range is particularly advantageous for ascending steep grades or for utilizing the engine as a brake in descending grades.

The possibilities of the present control system will be appreciated by reference to Fig. 14 wherein the chart shows theoretical and practical characteristics of the invention. This chart represents the operation of the transmission in association with an engine having a maximum governed speed of between 2200 and 2400 r.p.m. Maximum engine governed speed results from full throttle operation, at which time the throttle valve delivers a pressure of, for example 67.5 p.s.i. This pressure is considerably less than the regulated pump pressure utilized in operating the transmission, which regulated pressure is maintained at approximately 100 p.s.i.

In the chart of Fig. 14 the lines A1, A2, A3, A4, A5 and A6 represent the relation between engine speed and transmission output shaft speed which occurs to cause a shift in the transmission from a lower speed ratio to a higher speed ratio when the vehicle is moving with the engine at zero or closed throttle position. Such a condition could occur only if the vehicle were coasting. For example, it will be seen that with zero or closed throttle the transmission would shift from first speed ratio to second speed ratio at an engine speed of approximately 1650 r.p.m., as exemplified by the line A1. The transmission output shaft speed at that time will be approximately 575 r.p.m. As the result of the shift from first speed ratio to second speed ratio the engine speed will drop to approximately 1340 r.p.m. and the transmission will remain in second speed ratio until the engine speed again approaches 1650 r.p.m., at which time the transmission would automatically shift to third speed ratio. The other lines, A3, A4, A5 and A6 graphically depict the operating conditions which would result in a progressive shift to the highest, or seventh speed ratio.

The lines B1 to B6 inclusive illustrate the relation between engine speed and transmission output speed which must exist to cause the transmission to shift from a higher speed ratio to a lower speed ratio, again at zero or closed throttle operation. It will be noted that the downshifts occur at both lower engine speed and transmission output shaft speed than the relative speed at which the upshifts occur.

Since it is contemplated that the engine will normally be operated at full throttle to obtain the maximum efficiency therefrom, the relation between engine speed and transmission output shaft speed requisite to a succession of shifts is shown by the lines C1 to C6 inclusive. For example, if the transmission is operating in first speed ratio, a shift therefrom to second speed ratio will occur when the engine attains a speed of approximately 2250 r.p.m. which is within the range of maximum governed engine speed. At this time the transmission output shaft speed will be in the neighborhood of 780 r.p.m. so that when the transmission automatically shifts from first speed ratio to second speed ratio the engine speed will immediately drop to approximately 1840 r.p.m. and the transmission will continue operating in second speed ratio until the engine again attains approximately maximum governed speed, at which time the transmission will automatically shift from second speed ratio to third speed ratio. The relation of speeds at this time is indicated by the line C2 which shows that the engine has attained a speed of approximately 2325 r.p.m. The progressive upshifts occur as indicated by the lines C3, C4, C5 and C6, and it will be obvious that these shifts all occur when the engine is operating substantially at its maximum governed speed.

The automatic downshifts occur at relatively lower engine speed and output shaft speed as indicated by the lines D1 to D6 inclusive, it being the purpose to prevent "hunting" of the transmission between two ratios, which would occur if the upshifts and downshifts occurred at approximately the same relative conditions.

It will be understood that, theoretically at least, the transmission may shift from a lower to a higher ratio at any point between, for example, the line A1 and the line C1, depending on throttle position, engine speed, load on the vehicle, etc. With a throttle valve pressure which can vary between zero and 67.5 p.s.i., it will be obvious that different governor pressures can be utilized to obtain the action of the shift valves which controls shifting of the transmission.

Operation of the transmission in the F-2 or "Hold" range is shown graphically for progressive upshifts by the lines E1 to E6 inclusive. For example, if the transmission is operating in first speed ratio with the manual valve in the F-1 or automatic position, it can be held in this speed ratio by moving the manual valve to the F-2 or "Hold" range. When this occurs full regulated pressure, i.e. 100 p.s.i., is supplied to all of the regulator plugs, with the result that considerably higher governor pressure will be required to move the shift valves, in this instance the first to second shift valve of the upper mechanism, than was previously required. Under actual operating conditions it has been determined that the engine would be required to attain a speed of approximately 2540 r.p.m. before the transmission output shaft speed would be high enough to develop governor pressure sufficiently high to open the first to second shift valve. This condition is shown by the line E1, indicating that with this engine speed a transmission speed of approximately 880 r.p.m. would be required to develop the necessary governor pressure. Since the engine has a maximum governed speed of 2400 r.p.m. it will be obvious that the speed necessary for this governor pressure could be developed in the transmission only by downhill travel of the vehicle, and such transmission speed is of course communicated to the engine. The safety factor in the operation of governor controlled engines requires that these engines be operated at a speed not greatly in excess of predetermined governor speed for the safety of the engine. Consequently, this transmission makes possible a shift from a lower speed ratio to a higher speed ratio when the transmission output shaft speed, and consequently engine speed, has exceeded governed engine speed not more than approximately 200 r.p.m.

The transmission may be held in any speed ratio automatically selected by movement of the manual valve to the F-2 range at any time. For example, if the transmission is operating in fifth speed ratio and the manual valve is moved to the F-2 range, this ratio will be maintained so long as the engine operates at not more than predetermined governed speed. In fact, an engine speed of approximately 2500 r.p.m. would be necessary to overrule the action of the regulated pressure on the shift valves, thereby to cause a shift from fifth speed to sixth speed ratio.

The various lines E1 to E6 inclusive illustrate the relation between engine speed and transmisison output shaft speed which will cause progressive upshifting of the transmission during operation in the F-2 range.

The lines H1 to H6 inclusive illustrate the relation between engine speed and transmission output shaft speed which must exist for the transmission to shift from a higher speed ratio to a lower speed ratio during operation in the F-2 range. For example, referring to line H6, it will be seen that when operating in seventh speed ratio if the engine is decelerated to a speed slightly in excess of 1800 r.p.m., the transmission will automatically shift to sixth speed ratio. The other lines of the H series illustrate the relations necessary for other downshifts.

It is entirely possible that during the operation of the transmission in the F-1 range a movement of the manual valve to the F-2 range could cause an immediate downshift from the speed ratio in operation, when this manual valve movement is made, to the next lower speed ratio. Such an operation however would not be undesirable.

Reverse

To operate the mechanism for reverse drive it is necessary to move the manual valve 200 to the R position of Fig. 8. Such movement provides oil under line pressure from pump 33 through the line 301, branch 310, to the bore of the manual valve from which it exits through the line 350 to the reverse unit, at which point it is directed to act against piston 74 thereof, causing this piston to clamp cone 71 to the fixed cone 72. Branch line 352 from line 350 extends to the control piston of pump 33, actuating it to increase the pressure output of the pump. As the result of this interaction, the pressure of the oil supplied to piston 74 is increased to approximately double the pressure normally supplied by the pump during forward operation of the transmission. Oil supplied to the bore of the manual valve through the branch 310 also passes therefrom through line 311 to the valve body of front valve 208 to exit therefrom, under suitable conditions, through the line 312 which, as before explained, extends to the front servo to cause it to apply the band 42 to drum 41 of the front driving unit. The front clutch is exhausted through branch 314 joining line 315, which extends to the double transition valve and therefrom through line 316 to exhaust at the shift valve 214.

In reverse it is necessary that the rear band be released and the rear clutch exhausted. To accomplish the former, line pressure is supplied through conduit 301, branch 302, to the bore of the manual valve, and therefrom through line 304 to the rear servo, actuating the same to release the band in the manner previously described. The rear clutch is exhausted through line 309 to the shift valve 215.

The upper mechanism is in condition for driving the vehicle in reverse since the front driving unit is in reduction ratio while the rear band is released and the rear clutch is exhausted and the ring gear of the reverse planetary unit is locked against rotation. The flow of power therefore extends through the first drive unit in reduction to the sun gear 50 acting upon the planets carried by the carrier 64. Assuming that the vehicle is at rest, this carrier 64 is initially braked due to the output shaft 65 being connected to the wheels of the vehicle. Rotation of sun gear 50, under this condition, causes the planets of carrier 64 to act as idlers, the rotation of which imparts rotation to ring gear 54 in the opposite direction to that of the sun gear 50. Ring gear 54 drives sun gear 68 of the reverse planetary unit in this reverse direction and, since the ring gear 70 thereof is held against rotation, the carrier 69 and its planets must rotate in the same direction as the ring gear 68. Planet 69 is connected directly to the output shaft 65 so that rotation of this carrier in reverse direction causes rotation of the output shaft also in the reverse direction. This reverse rotation is immediately imparted to the planet 64, with the end result that the output shaft continues reverse rotation at a reduced rate. It will be seen that the reduction obtained in the first drive unit is added to that obtained in the reverse unit for an overall reduction higher than that employed in forward drive.

Since a greatly increased oil pressure is utilized for assuring locking of the reverse cone 71 which is accomplished by action of the variable capacity pump 33, which in turn supplies fluid also to the front band, it is advisable to prevent this increased pressure from acting on the front servo and therefore use is made of the front valve 208 arrangement. Referring to Fig. 8, it will be seen that oil, entering the valve casing through line 311, passes through a channel into a space between land 370 and land 371 of valve 208. It also can pass around the lower end of the land 371 into the interior thereof in which is located spring 372. Fig. 8 shows the position of this front valve in both normal driving range and in low range and, due to the contact of the upper end of the valve stem with the manual valve, the port communicating with outlet line 312 is held partially open so that normal line pressure can be delivered to the front servo to apply the same. However, when the manual valve is in reverse position, spring 372 can force valve 208 upwardly until the land 370 is arrested against further movement. The pointed end of the manual valve makes this possible. At the time fluid is supplied to the control valve of pump 33 through line 352, a part thereof is diverted through branch 356 to the upper surface of the land 370. Thus there is present increased pump line pressure at the top of land 370 and at the bottom effectively of land 371, but the latter pressure becomes available only after the line pressure at the top of the land 370 has moved the valve downwardly sufficiently to open the port leading to outlet line 312. When the reaction in line 312 reaches a point at which the pressure, so developed, can co-act with spring 372 to close this port, further increased servo pressure is prevented. The valve 208 therefore acts as a regulator to permit supply of oil to the front servo at approximately half the increased pump pressure, thereby preventing damage to the front band and its associated mechanism, which might result from exceedingly high servo oil pressure.

With the two mechanisms operating as described in connection with "F-1 Range," and with the final unit in reduction, it will be apparent that the vehicle speed can be increased to the maximum possible with the particular engine employed. However, further increase in vehicle speed can be obtained by shifting the final unit from reduction drive to direct drive. The exact manual controls for accomplishing this change have not been shown, but it will be apparent that any type of control can be used, preferably one in which it is necessary to simultaneously move the controls for the two mechanisms into neutral position before the disengagement of the reduction drive cone clutch or the direct drive plate clutch in the final unit and engagement of the other unit. Since the two mechanisms must have the control valves of each thereof in neutral position momentarily, it follows that fluid will be exhausted from the shift valves and their associated parts during this pause, with the result that only fluid to cause release of the rear band in each mechanism will be operative. When the direct drive clutch or cone is engaged in the final unit, the speed of rotation of each of the output shafts, 65 and 65', will be changed immediately so that, when the manual valve of each mechanism is again located in driving range position, the effect will be that each mechanism will be activated in such gear ratio as will accommodate the mechanisms to changed output shaft speed. For example, if the mechanisms have been operating in seventh speed with the final unit in reduction, a change may be made to activate the final unit in direct drive, as a result of which the speed of rotation of the output shafts will be so reduced that, when these mechanisms are again operated to transmit power, they will begin such transmission in second or third ratios as the gearing may demand. After such reactivation of the mechanisms, the advance through the range of gear ratios will be continued in the manner previously described until these mechanisms again reach a condition establishing seventh speed.

The transmission, hereinbefore described as embodying one form of this invention, provides a wide range transmission for trucks, buses, and other heavy duty vehicles. This transmission incorporates improvements in operation such as, for example, continued acceleration throughout a range of gear shifts due to the application of force separately and differentially to the two mechanisms from a single source of motive power. The parts of the planetary differential gearing connected respectively to the two mechanisms offer mutual reaction and, consequently, so long as each thereof continues its reaction to the other substantially uninterruptedly, the transmission of power from the engine to the propeller shaft will be of a continuous nature. Therefore, if the shifts in the two mechanisms are accomplished cleanly and without appreciable lag, the mutual reaction will be maintained so that acceleration of the vehicle can be made substantially continuous. Another advantage resides in the fact that, with this continuous acceleration, there is very little drop in engine speed during any particular shift in either mechanism so that the engine, particularly a diesel engine, can be operated at its maximum efficiency through the range of shifting.

This invention also makes provision for utilizing the engine and transmission for power purposes while the vehicle is at rest. To accomplish such purpose, the valve 126 can be moved to its intermediate position, blocking the port 116, so that oil from the reservoir or from the pumps cannot continue either to the reduction cone actuator of the final unit or to the direct clutch thereof. Under this condition, it will be obvious that the propeller shaft 87 has no motion of any kind imparted thereto. Consequently, a power take-off shaft can be connected to the idler gear 81 between gears 80 and 80' so that, when the engine and the mechanisms are operated, this gear train will also operate and the take-off can be used to drive any desired piece of machinery.

While the invention has been described in connection with two mechanisms driven through the agency of a fluid coupling, it will be apparent that other types of well-known mechanisms can be employed in this fashion. By reference to Fig. 12 of the drawings, it will be seen that two types of mechanisms, indicated by blocks A and B, can be operated in parallelism. The mechanisms may be of any well-known type; for example, the type utilizing a hydrodynamic torque converter and gearing, or another type employing a fluid coupling intermediate the two planetary units of a compound transmission such as are shown in U.S. Patents Nos. 2,176,138; 2,211,233; 2,377,696; or the pending applications of Walter B. Herndorn, S.N. 199,806, filed December 8, 1950, now Patent No. 2,763,162 for Transmission and Fluid Pressure Control; and S.N. 235,213, filed July 5, 1951, now Patent No. 2,790,327 for Transmission Control System; or the mechanisms may be of any well-known automatic type, or even semi-automatic type. In the particular arrangement shown in Fig. 12, it will be seen that the output shaft 500 of the engine, indicated by the block E, serves to drive the bevel gear spider or carrier 501, on the outer portions of which are mounted planet bevel gears 502. The engine E can be provided with a speed governor such as that shown in the before-identified Adler et al. Patent 2,270,100. Shaft 503, at the right of the spider 501, is attached to crown gear 504 meshing with gears 502, and to gear 505 meshing with gear 506 on the input shaft 507 of mechanism A. The opposing crown gear 508 is attached to the drum member 509 and also to sleeve 510 and pinion 511, which drives gear 512 on the input shaft 514 of mechanism B.

The output shafts 515 and 516 of the respective units are connected by gearing 517, 518 and 519 to the propeller shaft 520. Of course, a final reduction-direct drive unit 521, such as that previously described, can be employed as desired.

In this arrangement, it will be evident that the imputs of the two mechanisms are differentially driven by the engine E, while the outputs are connected in any desired gear ratio so that these mechanisms, if of automatic shift type, can function in the same manner as the mechanisms of Figs. 1 to 11 inclusive.

Furthermore, it will be obvious that the invention is not limited to the employment of two mechanisms in parallel, but can be extended to include as many mechanisms, operating sequentially, as can be accommodated by available space and as may be required by existing conditions.

A manner in which the increase in mechanisms can be accomplished will become more evident by reference to Fig. 13 in which the engine indicated by the block E has a governor, indicated diagrammatically, and has a drive shaft 600 connected to a planet carrier 601 having planets 602 in mesh with a sun gear 604 and a ring gear 605. Sun gear 604 is secured to shaft 620 which constitutes the input shaft for mechanism A which may be of any of the types either described in detail or in general terms. The ring gear 605 is connected to a pinion 606, which drives shaft 621, through the idler gear 607 and the gear 608 secured to shaft 621. Shaft 621 constitutes the input shaft for the mechanism B. Mechanism A has an output shaft 630 with gear 631 driven thereby, while mechanism B has an output shaft 632 with gear 634 driven thereby. Gears 631 and 634 mesh with gear 635 to drive the same and this latter gear may be secured to the propeller shaft 636. With this arrangement, due to the interposition of the idler gear 607 in the input to mechanism B and the idler gear 635 connected to the output shaft of the two mechanisms, it follows that the input shafts of the two mechanisms rotate in the same direction and the output shafts thereof also rotate in the same direction. While the propeller shaft 636 has been shown as being driven by the idler gear 635, it is obvious that the propeller shaft can be driven directly by either of the other gears 631 or 634. Furthermore, a final reduction-direct drive unit may be added to the propeller shaft if desired.

In the practice of this invention, regardless of the mechanism used therein, it is to be understood that the differential gearing connecting the inputs of these mechanisms can be so selected as to divide the torque load between the mechanisms in any suitable proportion. Since the upper mechanism in the detailed description normally rotates at a higher speed than the lower mechanism in the same gear ratio, it may be desirable to cause this upper unit to carry either a higher or a lower proportion of the torque load. On the other hand, it may well be that most advantageous operation of the transmission can be obtained by an equal division of torque load. In either situation it will be evident that the output power used in driving the vehicle is divided between the output shafts of the two mechanisms, with one shaft delivering more power than the other alternately as the mechanisms progress through their pattern of shift change.

While in all of the transmissions illustrated and described the output shafts have been shown as being connected by gearing, it will be evident to those skilled in the art that the benefits of the invention can be employed with other arrangements so long as the output shafts are connected to load in a predetermined speed relation. Hence, the term "output shafts connected to load" appearing in the claims is to be so construed.

While the present invention has been described in connection with the illustrated transmission incorporating two mechanisms in parallel, it will be obvious that the invention can readily be applied to a single mechanism; for example, of the type shown and described in the previously identified Herndon applications. In fact, the invention is adaptable to any type of automatic transmission wherein use is made of throttle valve pressure opposed to governor pressure for controlling the establishment of various speed ratios.

It will be apparent to those skilled in the art that the invention is capable of considerable modification and, therefore, any limitations imposed are to be only those set forth in the following claims.

What is claimed is:

1. The combination with an engine having a governor to limit to a maximum the driving speed thereof, a plural step ratio transmission for transmitting torque from and to said engine, hydraulically operated mechanism for establishing various speed ratios in said transmission, and hydraulic means for holding said mechanism in condition establishing any speed ratio against shift to a higher speed ratio until said engine is driven at a speed of rotation which exceeds a predetermined maximum higher than said maximum engine driving speed.

2. The combination with an engine having a governor to limit to a maximum the driving speed thereof, a plural step ratio transmission for transmitting torque from and to said engine and having an output shaft, hydraulically operated mechanism for establishing various successively higher speed ratios in said transmission in response to increase in output shaft speed, and hydraulic means for holding said mechanism in condition establishing any lower speed ratio against shift to a higher speed ratio until said engine is driven by said transmission at a speed of rotation which exceeds a predetermined maximum.

3. The combination with an engine having a governor to limit to a maximum the driving speed thereof, a plural step ratio transmission for transmitting torque from and to said engine and having an output shaft, hydraulically operated mechanism for automatically establishing various successively higher speed ratios in said transmission at output shaft speeds resulting from substantially maximum governed engine speed in each speed ratio, and hydraulic means for holding said mechanism in condition establishing any lower speed ratio against shift to a higher speed ratio until said output shaft is rotated at a speed which exceeds the speed at which said output shaft can be driven by said engine operating at maximum driving speed thereof in the lower ratio.

4. The combination with an engine having a governor to limit to a maximum the driving speed thereof and having a throttle for controlling fuel feed, of a plural step ratio transmission, a throttle valve delivering hydraulic pressure varying in accordance with throttle position, a hydraulic governor driven by said transmission and delivering hydraulic pressure varying in accordance with transmission speed, shift valves for the forward speed ratios of said transmission, said shift valves being subject to hydraulic pressure from said throttle valve opposed by hydraulic pressure from said hydraulic governor, and means for holding said transmission in any forward speed ratio thereof comprising a manually operated valve for directing to said shift valves hydraulic pressure higher than the maximum pressure of that from said throttle valve to oppose hydraulic pressure from said hydraulic governor, the areas of said shift valves having opposing hydraulic pressures thereon being proportioned so that said means holds said transmission against shift to a higher forward speed ratio until said hydraulic governor delivers hydraulic pressure to said shift valves higher than could be developed by drive of said transmission in the held ratio at maximum governed engine driving speed.

5. The combination with an engine having a governor to limit to a maximum the driving speed thereof and having a throttle for controlling fuel feed, of a plural step ratio transmission, a source of regulated hydraulic pressure, a throttle valve delivering hydraulic pressure varying in accordance with throttle position and having a maximum pressure lower than said regulated pressure, a hydraulic governor driven by said transmission and delivering hydraulic pressure varying in accordance with transmission speed, shift valves for the forward speed ratios of said transmission, said shift valves being subject to hydraulic pressure from said throttle valve opposed by hydraulic pressure from said hydraulic governor, and means for holding said transmission in any forward speed ratio thereof comprising a manually operated valve for directing said regulated hydraulic pressure to said shift valves to oppose hydraulic pressure from said hydraulic governor, the areas of said valves having opposing hydraulic pressures thereon being proportioned so that said means holds said transmission against shift to a higher forward speed ratio until said hydraulic governor delivers hydraulic pressure to said shift valves higher than could be developed by drive of said transmission in the held ratio at maximum governed engine driving speed.

6. The combination with an engine having a governor to limit to a maximum the driving speed thereof and having a throttle for controlling fuel feed, of a plural step ratio transmission, a throttle valve delivering hydraulic pressure varying in accordance with throttle position, a hydraulic governor driven by said transmission and delivering hydraulic pressure varying in accordance with transmission speed, shift valves for the forward speed ratios of said transmission, said shift valves being subject to hydraulic pressure from said throttle valve opposed by hydraulic pressure from said hydraulic governor, and means for holding said transmission in any lower forward speed ratio thereof against shift to the next higher speed ratio comprising a manually operated valve for directing to said shift valves hydraulic pressure higher than the maximum pressure of that from said throttle valve to oppose hydraulic pressure from said hydraulic governor, the areas of said shift valves having opposing hydraulic pressures thereon being proportioned so that said transmission is held in the lower forward speed ratio until said transmission rotates at a speed in predetermined excess of that which could result from maximum governed engine driving speed in said lower speed ratio.

7. The combination with an engine having a governor to limit to a maximum the driving speed thereof and having a throttle for controlling fuel feed, of a plural step ratio transmission, hydraulically operated mechanism for establishing forward speed ratios in said transmission, a throttle valve delivering hydraulic pressure varying in accordance with throttle position, a hydraulic governor driven by said transmission and delivering hydraulic pressure varying in accordance with transmission speed, shift valves for controlling said mechanism, said shift valves being subject to hydraulic pressure from said throttle valve opposed by hydraulic pressure from said hydraulic governor, said shift valves being automatically operated by said varying hydraulic pressures to establish successively higher forward speed ratios in said transmission, and means for holding said transmission in any lower forward speed ratio thereof against shift to a higher forward speed ratio comprising a manually operated valve for directing to said shift valves hydraulic pressure higher than the maximum pressure of that from said throttle valve to oppose hydraulic pressure from said hydraulic governor, the areas of said shift valves having opposing hydraulic pressures thereon being proportioned so that said means is overruled by hydraulic pressure developed by said hydraulic governor at transmission speed of a predetermined excess over that which could result from maximum governed engine driving speed.

8. The combination with an engine having a governor to limit to a maximum the driving speed thereof and having a throttle for controlling fuel feed, of a plural step ratio transmission, a throttle valve delivering hydraulic pressure varying in accordance with throttle position, a hydraulic governor driven by said transmission and delivering hydraulic pressure varying in accordance with transmission speed, shift valves for the forward speed ratios of said transmission, said shift valves being subject to hydraulic pressure from said throttle valve opposed by hydraulic pressure from said hydraulic governor, said shift valves being automatically operated to cause successive increases in transmission forward speed ratios when maximum pressure from said throttle valve is opposed by pressure from said hydraulic governor developed by drive of said transmission at maximum governed engine speed in each lower forward speed ratio, and means for holding said transmission in any lower forward speed ratio thereof comprising a manually operated valve for directing to said shift valves hydraulic pressure higher than the maximum pressure of that from said throttle valve to oppose hydraulic pressure from said hydraulic governor, the areas of said shift valves having opposing hydraulic pressures thereon being proportioned so that said means is overruled and shift to the next higher forward speed ratio compelled by hydraulic pressure from said hydraulic governor resulting from transmission speed in a predetermined excess over the transmission speed which could result from drive of said engine at its maximum governed driving speed.

9. The combination with an engine having a governor to limit to a maximum the driving speed thereof and having a throttle for controlling fuel feed, of a plural step ratio transmission driven by said engine and having an output shaft, a throttle valve delivering hydraulic pressure varying in accordance with throttle position, a hydraulic governor driven by said output shaft and delivering hydraulic pressure varying in accordance with output shaft speed, shift valves for the forward speed ratios of said transmission, said shift valves being subject to hydraulic pressure from said throttle valve opposed by hydraulic pressure from said hydraulic governor with said governor pressure moving said shift valves to establish successively higher forward speed ratios, and means for holding said transmission in any lower forward speed ratio thereof against shift to a higher ratio comprising a manually operated valve for directing to said shift valves hydraulic pressure higher than that from said throttle valve to oppose hydraulic pressure from said hydraulic governor, the areas of said shift valves having opposing hydraulic pressures thereon being proportioned so that governor pressure higher than that developed by drive of said output shaft in said lower ratio at maximum governed engine driving speed is required to shift said transmission to the next higher forward speed ratio.

References Cited in the file of this patent

UNITED STATES PATENTS

| | | |
|---|---|---|
| 2,645,135 | Frank | July 14, 1953 |
| 2,763,162 | Herndon | Sept. 18, 1956 |
| 2,788,678 | Sheppard | Apr. 16, 1957 |

FOREIGN PATENTS

| | | |
|---|---|---|
| 110,968 | Sweden | June 20, 1944 |
| 472,619 | Great Britain | Dec. 21, 1935 |
| 689,125 | Great Britain | Mar. 18, 1953 |
| 805,597 | Germany | May 25, 1951 |
| 1,028,048 | France | Feb. 25, 1953 |